United States Patent
Ramu

(10) Patent No.: US 7,271,564 B2
(45) Date of Patent: Sep. 18, 2007

(54) METHOD, APPARATUS, AND SYSTEM FOR DRIVE CONTROL, POWER CONVERSION, AND START-UP CONTROL IN AN SRM OR PMBDCM DRIVE SYSTEM

(75) Inventor: Krishnan Ramu, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 0 days.

(21) Appl. No.: 10/996,043

(22) Filed: Nov. 24, 2004

(65) Prior Publication Data

US 2005/0146304 A1    Jul. 7, 2005

Related U.S. Application Data

(63) Continuation of application No. PCT/US03/16631, filed on May 27, 2003.

(60) Provisional application No. 60/382,608, filed on May 24, 2002, provisional application No. 60/382,609, filed on May 24, 2002, provisional application No. 60/382,610, filed on May 24, 2002.

(51) Int. Cl.
  *H02P 1/46* (2006.01)
  *H02P 7/06* (2006.01)

(52) U.S. Cl. .................. 318/701; 318/254; 318/700

(58) Field of Classification Search .......... 318/245, 318/254, 700, 701, 746, 747, 778, 785, 786
See application file for complete search history.

(56) References Cited

U.S. PATENT DOCUMENTS

| | | | | |
|---|---|---|---|---|
| 3,753,062 A | * | 8/1973 | Greenwell | 318/810 |
| 3,780,324 A | * | 12/1973 | Greenwell | 310/180 |
| 3,838,322 A | * | 9/1974 | Greenwell | 318/810 |
| 3,965,409 A | * | 6/1976 | Klautschek | 363/124 |
| 4,404,512 A | * | 9/1983 | Greenwell | 318/807 |
| 4,500,824 A | | 2/1985 | Miller | |
| 4,684,867 A | | 8/1987 | Miller et al. | |
| 4,707,650 A | * | 11/1987 | Bose | 318/685 |
| 4,748,388 A | | 5/1988 | Muller | |
| 5,115,181 A | * | 5/1992 | Sood | 318/701 |
| 5,650,699 A | | 7/1997 | Tang et al. | |
| 5,705,918 A | * | 1/1998 | Davis | 322/94 |
| 5,708,337 A | | 1/1998 | Breit et al. | |
| 5,764,019 A | * | 6/1998 | Webster | 318/701 |
| 5,847,523 A | | 12/1998 | Rappenecker et al. | |
| 5,920,176 A | * | 7/1999 | Blackburn et al. | 318/701 |
| 6,060,858 A | * | 5/2000 | Blackburn et al. | 318/701 |
| 6,140,729 A | * | 10/2000 | Pollock et al. | 310/166 |

(Continued)

FOREIGN PATENT DOCUMENTS

JP    06165530    6/1994

*Primary Examiner*—Paul Ip
(74) *Attorney, Agent, or Firm*—Stevens, Davis, Miller & Mosher, LLP

(57) ABSTRACT

A power converter for a switched reluctance motor or a permanent magnet brushless direct current (dc) motor may include first and second partial circuits for forming multiple conduction circuits in cooperation with first and second phase windings of the motor. The controller also includes a switch operable to open and close a first conduction circuit, which includes the first phase winding, and to regulate energization of the first and second phase windings of the motor through opening and closing the first conduction circuit. Control of the switch provides four-quadrant operation of the motor through regulated energization of the first and second phase windings.

34 Claims, 20 Drawing Sheets

U.S. PATENT DOCUMENTS

| | | | |
|---|---|---|---|
| 6,166,500 A * | 12/2000 | Makaran | 318/254 |
| 6,201,368 B1 | 3/2001 | Webster | |
| 6,204,617 B1 | 3/2001 | Van Hout et al. | |
| 6,291,949 B1 | 9/2001 | Green | |
| 6,630,805 B2 * | 10/2003 | Makaran | 318/254 |
| 6,646,406 B1 * | 11/2003 | Pollock et al. | 318/599 |
| 6,788,020 B1 * | 9/2004 | Pollock et al. | 318/599 |
| 6,850,029 B1 * | 2/2005 | Pollock et al. | 318/727 |
| 6,867,561 B1 * | 3/2005 | Pollock et al. | 318/254 |
| 7,049,786 B1 * | 5/2006 | Toliyat et al. | 318/701 |
| 2001/0000293 A1 * | 4/2001 | Makaran | 318/254 |
| 2005/0116679 A1 * | 6/2005 | Ramu | 318/700 |

* cited by examiner

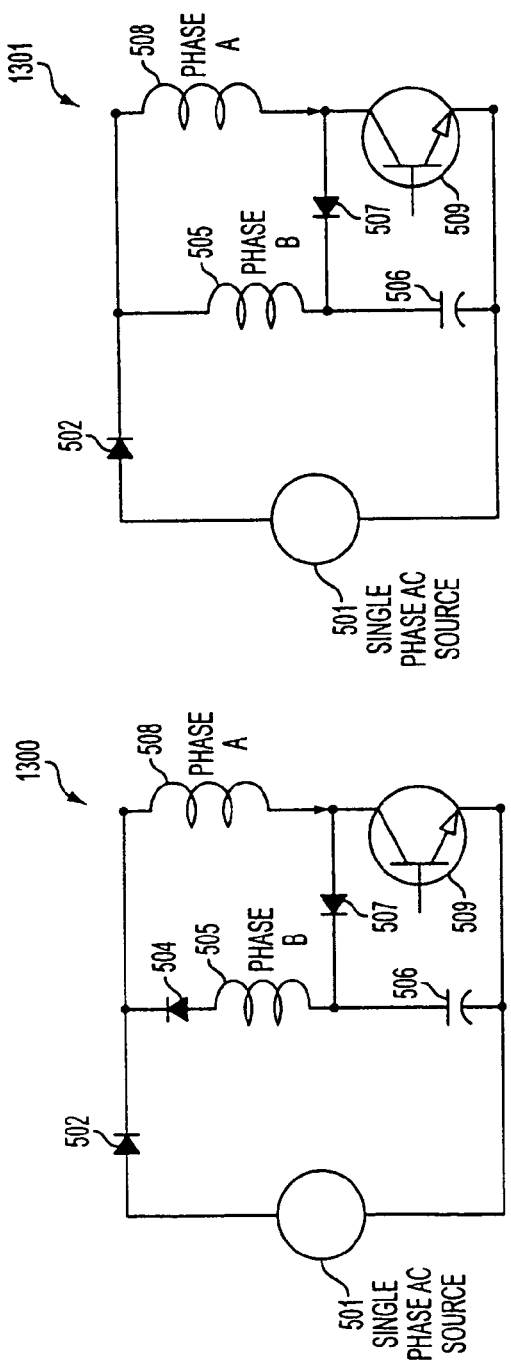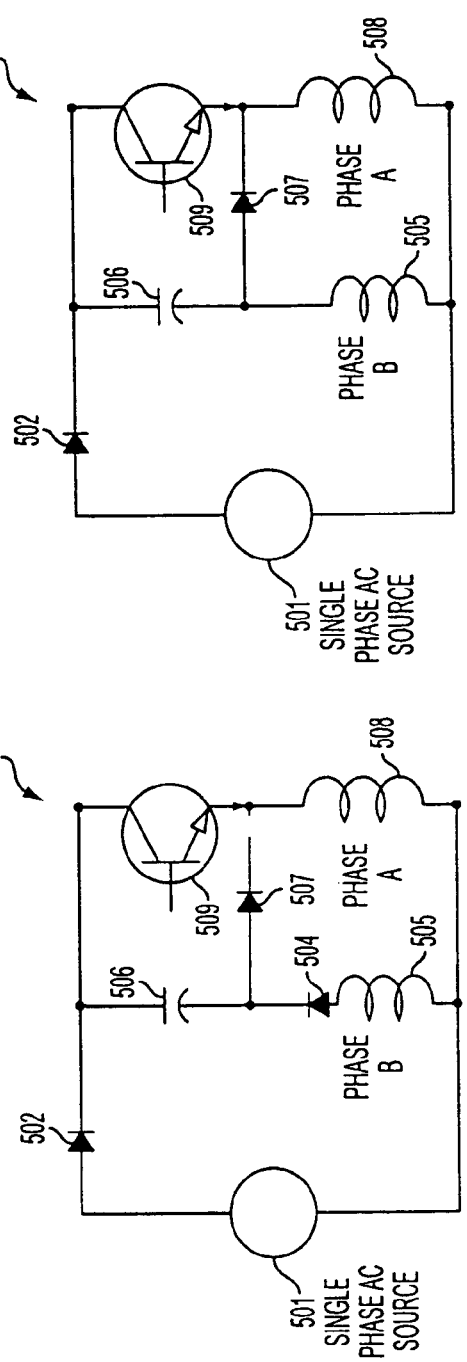

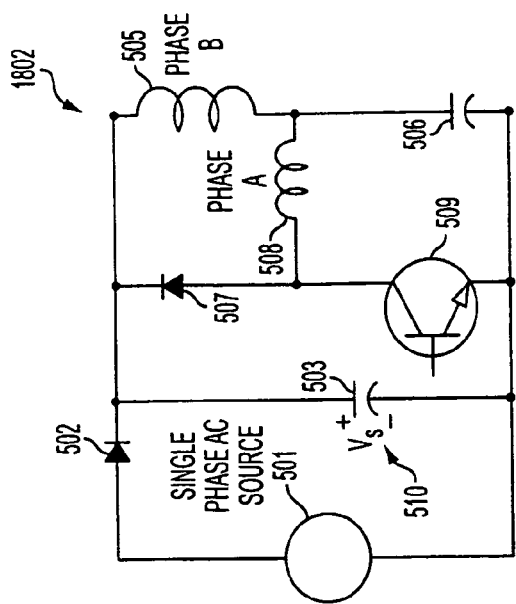
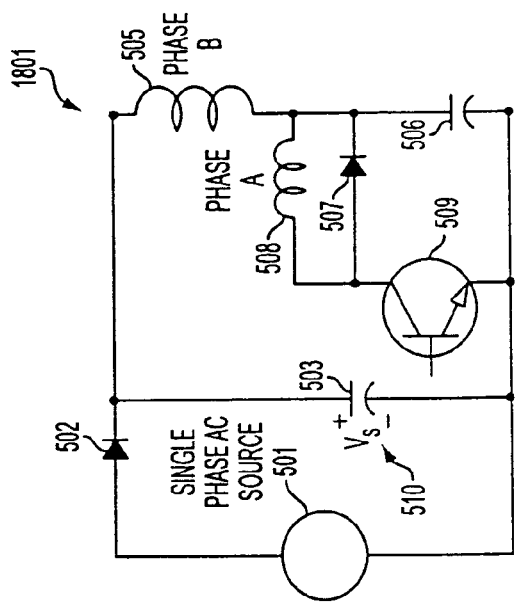
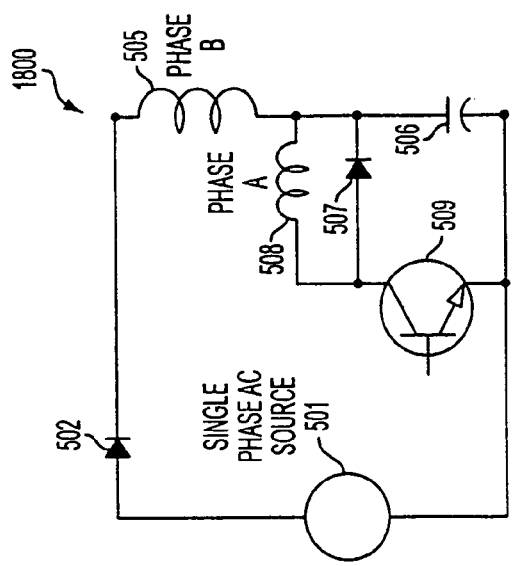
FIG. 18(a)
FIG. 18(b)
FIG. 18(c)

METHOD, APPARATUS, AND SYSTEM FOR DRIVE CONTROL, POWER CONVERSION, AND START-UP CONTROL IN AN SRM OR PMBDCM DRIVE SYSTEM

CROSS-REFERENCE TO RELATED APPLICATIONS

This is a continuation of PCT International application serial number PCT/US03/16631 filed May 27, 2003, which is based on provisional application Ser. Nos. 60/382,608, 60/382,609 and 60/382,610 all filed on May 24, 2002.

BACKGROUND OF THE INVENTION

1. Field of the Invention

The present invention relates to a method, an apparatus, and a system for drive control, power conversion, and start-up control in an SRM or a PMBDCM drive system.

2. Discussion of Related Art

Variable speed motor drives are expected to play an increasingly important role in improving home appliances particularly in their ability to meet existing and proposed federal efficiency requirements. In such motor drives, cost reduction is important. Cost reductions can come from one or more subsystems, i.e., the motor, power converter, and controller. Of all existing motor drive systems, switched reluctance machines (SRMs) offer the greatest potential for cost reduction in their subsystems, and the power converter is the primary subsystem where cost can be substantially reduced. Following is a brief description of related art power converter topologies for a two-phase SRM.

FIG. 1 shows a related art asymmetric power converter for driving a two-phase SRM. Power converter 100 has two controllable and two uncontrollable power devices for each phase winding 101, 102 of the SRM. Therefore, four controllable 103–106 and four uncontrollable 107–110 power devices are required for power converter 100 to operate. The primary advantage of power converter 100 is that it gives full controllability in terms of its ability to apply full positive or negative direct current (dc) link voltage, and, therefore, it does not diminish or restrict any operating mode of the SRM. The disadvantage of this power converter topology is that it uses eight power devices. A more detailed description of power converter 100's circuit operation may be found in "Switched Reluctance Motor Drives", R. Krishnan, CRC Press, June 2001.

FIG. 2 illustrates a related art single switch-per-phase power converter for driving a two-phase SRM. Power converter 200's circuit topology is based on splitting a dc input source voltage 201 equally to the machine side power converter. This results in a circuit requiring one controllable and one uncontrollable power device per phase winding 202, 203. Therefore, overall, power converter 200 requires two controllable power devices 204, 205 and two uncontrollable power devices 206, 207 for a two-phase SRM. The major advantage of this circuit design is that it uses a reduced number of power devices (e.g., a total of four) compared to the asymmetric converter. The disadvantage of this circuit is that it reduces the available dc source voltage by half and, therefore, doubles the current rating required for the devices and for the machine, resulting in low efficiency machine operation. A fuller description of this circuit may be found in "Switched Reluctance Motor Drives", R. Krishnan, CRC Press, June 2001.

FIG. 3 illustrates a related art C-Dump power converter for driving a two-phase SRM. Power converter 300's circuit uses three controllable power devices 301–303 and three uncontrollable diodes 304–306, resulting in the use of six power devices. This is an intermediate circuit between those illustrated in FIGS. 1 and 2. The operating modes are somewhat restricted for this circuit, since it can apply full dc source voltage 309 to machine windings 307, 308 only in the positive direction. Furthermore, this circuit requires an external inductor 310 or a resistor (not shown) to dissipate the energy stored in C-dump capacitor 311. Use of external inductor 310 increases the cost, whereas the use of the power resistor (not shown) will result in a lower efficiency of the system and higher package volume, due to increased thermal considerations. Therefore, this circuit is not ideal for use with two-phase SRMs. A more detailed description of this circuit may be found in "Switched Reluctance Motor Drives", R. Krishnan, CRC Press, June 2001 and in Miller et al., U.S. Pat. No. 4,684,867, dated Aug. 4, 1987.

FIG. 4 illustrates a related art single switch-per-phase power converter for driving a two-phase SRM. Power converter 400 requires one uncontrolled power device 401, 402 and one controlled power device 403, 404 per phase 405, 406, and therefore, requires four power devices to function. Furthermore, power converter 400 requires a special winding in the machine, known as a bifilar winding. This special winding increases the copper volume in the machine windings, resulting in increased cost for the machine. Additionally, power switches 403, 404 experience higher voltage stresses due to the leakage inductance between the windings of the respective phase. This leakage inductance can be minimized but cannot be eliminated in a practical machine. Therefore, this converter circuit is not widely used, despite the fact that a full dc source voltage 407 can be impressed on the machine with full controllability of the current. A more in depth description of this circuit is found in "Switched Reluctance Motor Drives", R. Krishnan, CRC Press, June 2001 and in Miller, U.S. Pat. No. 4,500,824, dated Feb. 19, 1985.

All other heretofore known power converter circuit topologies fall into one of the above-described categories, in terms of the total number of power devices required for their operation. From the foregoing, it may be seen that a minimum of four power devices are required for operating a related art two-phase SRM.

Generally speaking though, commercial power converters used to drive a two-phase SRM usually have more than two controllable switches and more than two diodes. Circuits requiring only two controllable switches and two diodes have the disadvantages of high power loss, low efficiency, and a bifilar winding in the machine, thereby reducing the power density of the machine. Therefore, existing solutions are not attractive with regard to considerations of high efficiency operation, full range of speed control, compactness in the converter's packaging and, most importantly of all, the overall cost of the system.

A fundamental challenge in power converter development has been to reduce the number of power devices, both controllable and uncontrollable, to a level corresponding to that of a single-quadrant chopper drive, such as is commonly used in a dc motor drive or in a universal motor drive. A description of these drives is provided in "Switched Reluctance Motor Drives", R. Krishnan, CRC Press, June 2001. When the number of power devices has been reduced to this level, a brushless SRM drive becomes commercially competitive for variable speed applications. Moreover, the brushless SRM has the superior advantage of high efficiency, since there are no brushes and commutators in the SRM. Also, the brushless SRM is further endowed with high-speed operability, high reliability, maintenance-free operation, greater overload capability and, most of all, a cost advantage over the dc motor drive.

All reference material cited herein is hereby incorporated into this disclosure by reference.

SUMMARY OF THE INVENTION

The cost of a power converter is determined from its three parts: (i) an alternating current (ac) to direct current (dc) rectifier, (ii) a dc link filter that smooths the rectified voltage, and (iii) a machine-side power converter that supplies voltage/current regulated power to windings of the machine. The ac-to-dc rectifier and dc link filter components are common to most SRM power converter systems and to other existing variable speed motor drive systems.

A focus of the present invention is on the machine side power converter and its cost reduction. This cost reduction is accomplished by reducing the number of power devices forming the power converter. Power devices are both controlled devices (e.g., power transistors, MOSFETs, IGBTs, etc.) and uncontrolled devices (e.g., diodes). By reducing the number of power devices, a savings in, for example, reduced gate drive circuits, gate power supplies, heat sinks, and printed circuit board area may be achieved. Each of these factors contributes to reducing the cost of the power converter. In pursuit of reducing the cost of the machine side power converter, the present invention is directed to a single-switch power converter (SSPC) topology, in the various embodiments of this invention presented herein.

The present invention overcomes the disadvantages of related art power converters by using a circuit topology having one controllable switch and one diode (e.g., a fast switching diode) or optionally two diodes (e.g., one fast switching and the other slow). In reducing the number of controllable switches to one and the diode to one, the power converter's component and assembly costs are necessarily lower than those of all other available topologies.

Therefore, an object of the present invention is to overcome the shortcomings and problems encountered in related art devices.

Another object of the invention is to reduce the number of power devices required for a power converter.

Still another object of the invention is to provide a highly efficient power converter.

A further object of the invention is to provide a power converter having a full range of speed control.

A further object of the invention is to reduce the size of a power converter's packaging.

A further object of the invention is to reduce the overall cost of a brushless (switched reluctance and PM brushless) motor drive.

A further object of the invention is to provide a method of starting and operating a brushless (switched reluctance and PM brushless) motor.

The objects of the present invention may be achieved in whole or in part by a controller for a switched reluctance motor or a permanent magnet brushless direct current (dc) motor (PMBDCM) having first and second partial circuits for forming multiple conduction circuits in cooperation with first and second phase windings of the motor. The controller also includes a switch operable to open and close a first conduction circuit, which includes the first phase winding, and to regulate energization of the first and second phase windings of the motor through opening and closing the first conduction circuit. Control of the switch provides four-quadrant operation of the motor through regulated energization of the first and second phase windings.

The objects of the present invention may be further achieved in whole or in part by a switched reluctance motor or a permanent magnet brushless dc motor system having a brushless dc motor that has first and second phase windings. A switch of the brushless dc motor system is operable to open and close a first conduction circuit, which includes the first phase winding, and to regulate energization of the first and second phase windings of the motor through opening and closing the first conduction circuit. The switch is further operable to provide four-quadrant operation of the motor through regulated energization of the first and second phase windings.

The objects of the present invention may be further achieved in whole or in part by a method of controlling a multi-phase brushless dc motor, including the steps of (a) energizing a main winding of the motor with a first current; (b) discontinuing the energization of the main winding; (c) determining whether a rotor of the motor is rotating; and (d) energizing the main winding with a predetermined amount of current that differs from the first current.

The objects of the present invention may be further achieved in whole or in part by a method of starting a multi-phase brushless do motor, including the steps of determining whether a rotor pole of the motor is substantially aligned with a stator pole of the motor; energizing a winding of the motor to start a rotation of the rotor, if the rotor pole is determined not to be substantially aligned with the stator pole; and performing steps (a) through (c), below, if the rotor pole is determined to be substantially aligned with the stator pole. Step (a) involves energizing the winding with a first current. Step (b) is discontinuing the energization of the winding. And step (c) is determining whether the rotor is rotating.

The objects of the present invention may be further achieved in whole or in part by a start-up controller for a multi-phase brushless dc motor having a power converter that has a controllable switch for providing current to a winding of the motor. A sensor of the start-up controller detects an indication of the amount of current provided to the motor winding by the power converter and outputs this indication in a first signal. A determination device of the start-up controller determines, based on the first signal, whether the amount of current provided to the motor winding exceeds a threshold value and outputs an indication of this determination in a second signal. A controller of the start-up controller controls the controllable switch, in accordance with the second signal, by turning the controllable switch on to provide current to the motor winding and turning the controllable switch off to stop providing current to the motor winding.

BRIEF DESCRIPTION OF THE DRAWINGS

Preferred embodiments of the present invention will now be further described in the following paragraphs of the specification and may be better understood when read in conjunction with the attached drawings, in which:

FIGS. 13(a)–(d) illustrate two-phase SRM power converters that each have a single controllable switch and a single capacitor;

FIGS. 18(a)–(c) illustrate two-phase SRM power converters with active control applied mostly to one phase.

DETAILED DESCRIPTION OF THE INVENTION

Figure 1:
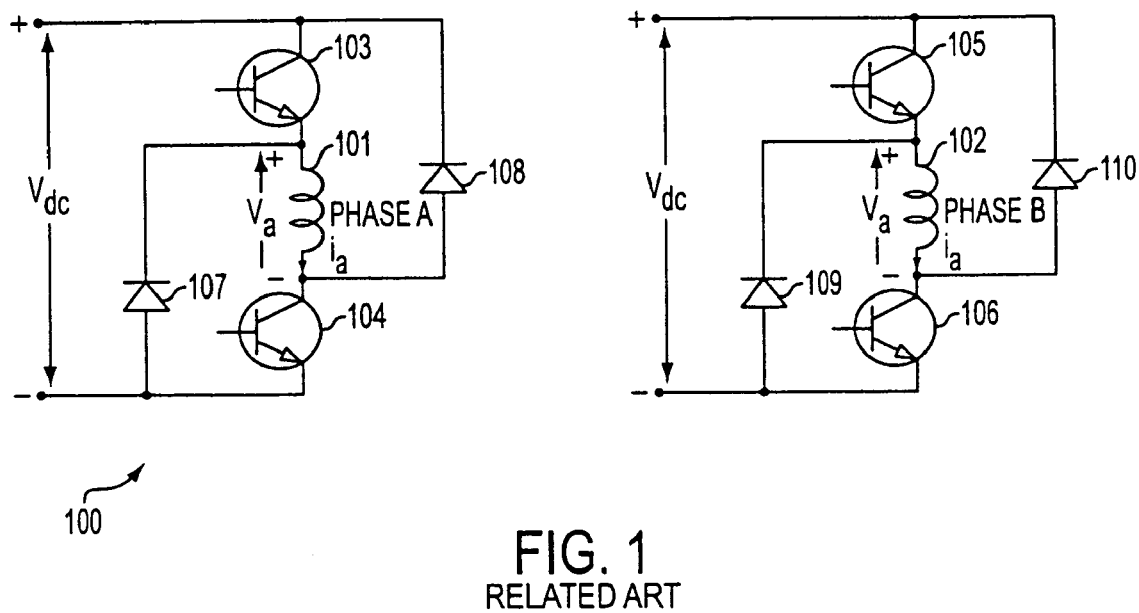
FIG. 1 illustrates a related art asymmetric power converter for driving a two-phase SRM.
Figure 2:
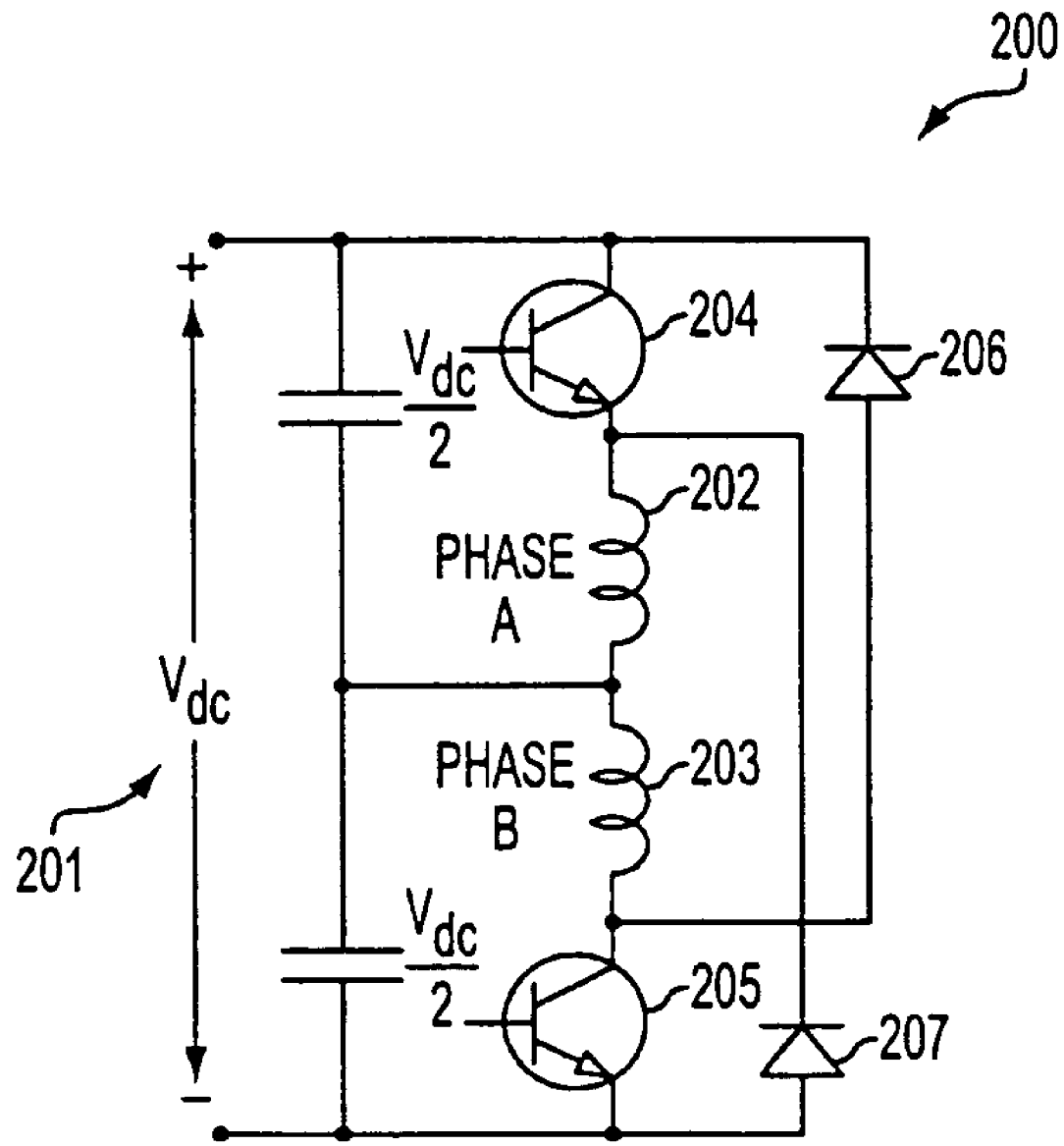
FIG. 2 illustrates a related art single switch-per-phase power converter for driving a two-phase SRM.
Figure 3:
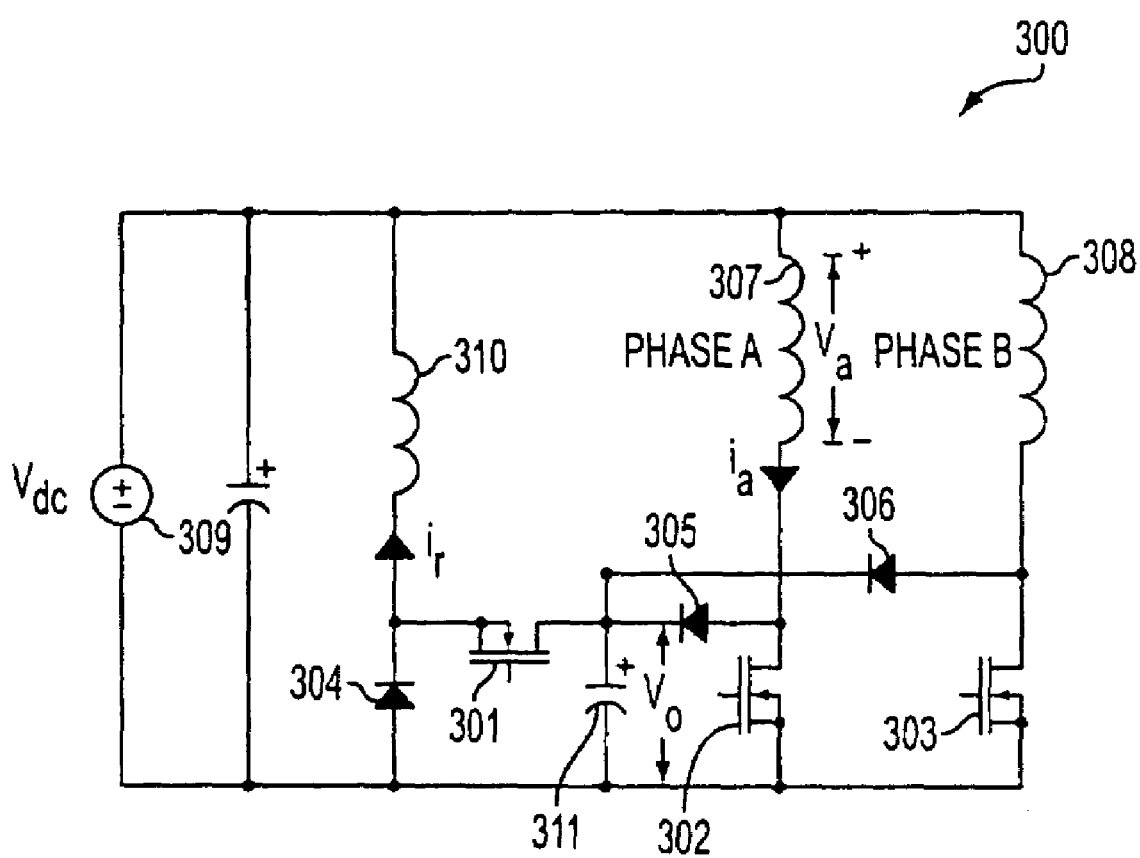
FIG. 3 illustrates a related art C-Dump power converter for driving a two-phase SRM.
Figure 4:
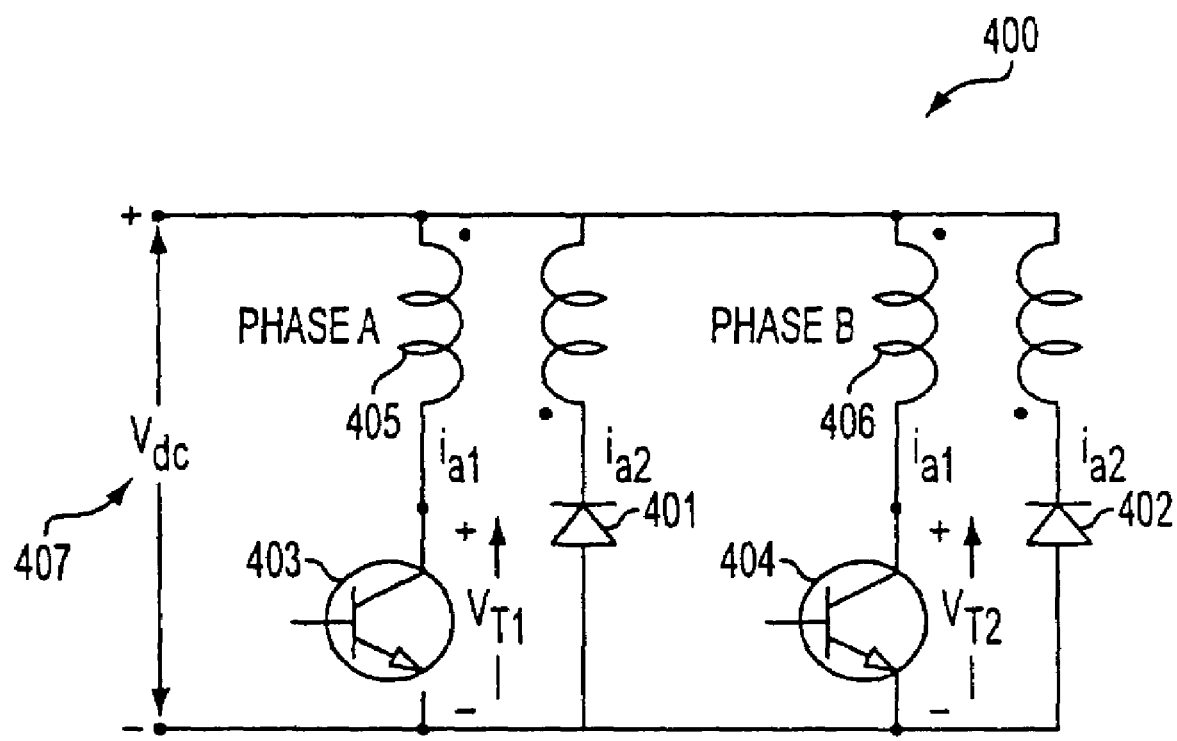
FIG. 4 illustrates a related art single switch-per-phase power converter for driving a two-phase SRM.
Figure 5A:
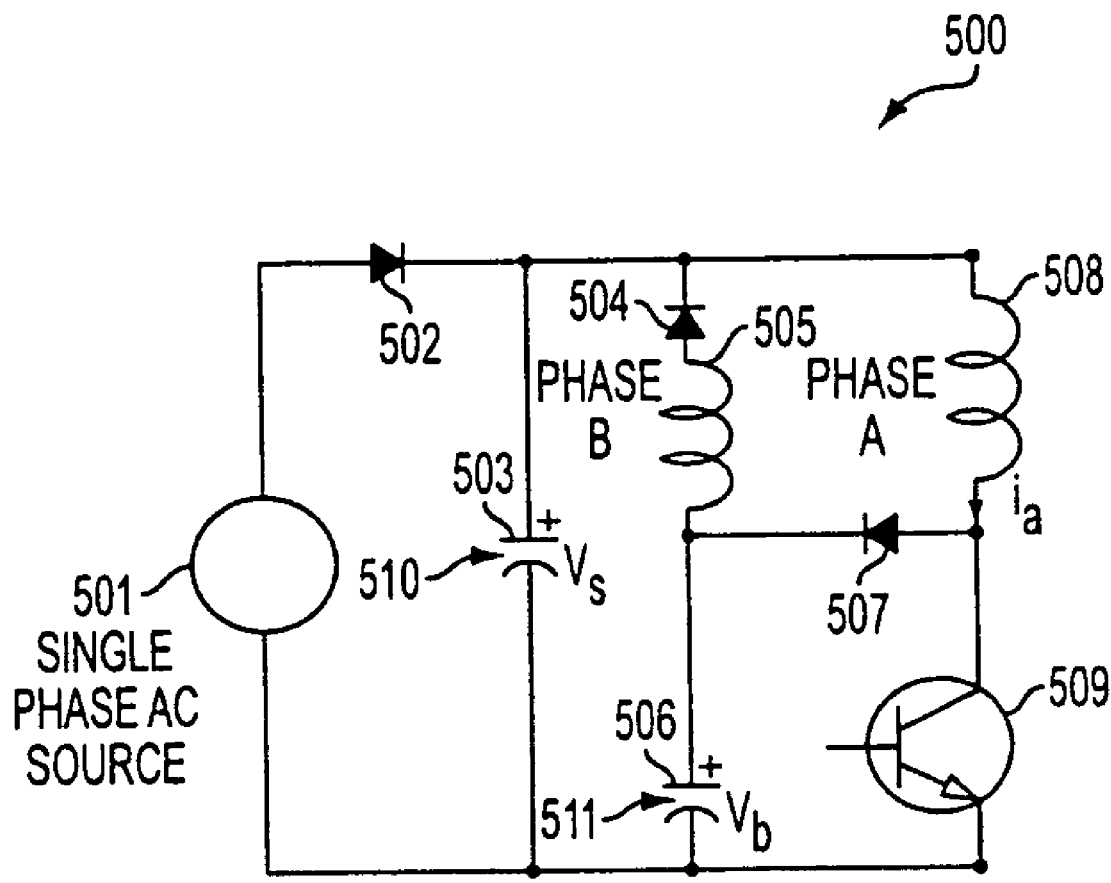
FIG. 5(a) illustrates a single-switch power converter for driving a two-phase SRM.

FIG. 5(a) illustrates a single-switch power controller in the form of converter 500 for driving a two-phase switched reluctance machine (SRM) according to the present invention. One winding of the SRM is alternatively referred to as a main or phase A winding 508, while the other winding is referred to as an auxiliary or phase B winding 505. Although the phase windings 505, 508 of the SRM may be spatially separated from the power converter 500 and may also be considered to form a part of the motor rather than part of the power converter, these windings 505, 508 are illustrated in the power converter circuit for the purpose of simplifying the description of their cooperative functionality with the power converter 500. For this reason, the windings 505, 508 will be illustrated within each embodiment of the power converter 500 described hereinafter.

When power converter 500 is activated by the application of an ac source voltage 501, a dc source 510 comes into effect through the rectification and filtering provided by diode 502 and dc source capacitor 503, respectively. As the dc source 510 comes into effect, current begins flowing through electrical paths that are parallel to capacitor 503. These parallel paths are provided by (1) auxiliary phase B winding 505 and an auxiliary capacitor 506, provided that an optional diode 504 is not included in the circuit, and (2) main phase A winding 508, diode 508, and auxiliary capacitor 506. The flow of current through these parallel paths charges auxiliary capacitor 506, and the energy stored in auxiliary capacitor 506 generates a current in auxiliary phase B winding 505 and dc source capacitor 503.

Because of the current flow in auxiliary winding 505, there will be a positive or negative torque produced in the SRM, depending on the SRM's rotor position with respect to auxiliary phase B winding 505's stator poles. If the rotor poles are coming toward the stator poles, the inductance slope is positive, and if the rotor poles are moving away from the stator poles, the inductance slope is negative. If there is a negative inductance slope, the torque produced will be negative and the machine will be generating and sending energy to source capacitor 503. If the inductance slope is positive, auxiliary phase B winding 505 will produce positive or motoring torque, which is torque output by the SRM.

When the current in auxiliary phase B winding 505 is constant and flows continuously, the average torque produced by auxiliary winding 505 is zero. However, current flow through auxiliary winding 505 will not remain constant. After a period of conduction, the current in auxiliary winding 505 discontinues, and this occurs when the voltages across auxiliary capacitor 506 and dc source capacitor 503 equalize. Thereafter, another way must be provided to charge auxiliary capacitor 506. Transistor switch 509 provides this other way.

Transistor switch 509 is turned on to provide power to main winding 508. In response to turning on transistor switch 509, a current path is established through dc source 510, main winding 508, and transistor switch 509. During the period transistor switch 509 is turned on, main winding 508 is operating in its energization mode. Transistor switch 509 is turned off either to regulate the current through main winding 508 or to stop its flow completely.

Due to the inductive nature of main winding 508, it is important to provide a path for the current to flow away from main winding 508 when transistor switch 509 is turned off. This path is provided by diode 507, auxiliary capacitor 506, dc source capacitor 503, and main winding 508 itself. The current flowing out of main winding 508 charges auxiliary capacitor 506, and this flow of current is the predominant way in which auxiliary capacitor 506 receives a charge, when operating the SRM.

The energy flow in auxiliary capacitor 506 and, hence, in auxiliary winding 505 is dependent on main winding 508's energy flow and, therefore, its duty cycle. As the speed of the SRM increases, the controllable duty cycle of transistor switch 509 increases, thereby increasing the duration of the voltage applied to main winding 508. Therefore, less charging of auxiliary capacitor 506 occurs, and, hence, less power is provided to auxiliary winding 505. During times of operating transistor switch 509 with a high duty cycle, the SRM behaves as though it is a single-phase SRM, with auxiliary winding 505 serving as a window to find the rotor position of the machine through its inductance. Auxiliary winding 505's inductance can be obtained from its current and voltage waveform or by some other technique known to those skilled in the art.

Auxiliary winding 505 returns to dc source capacitor 503 the energy it receives from main winding 508, when transistor switch 509 is turned off. During low speed operation, transistor 509's duty cycle is low and both auxiliary winding 505 and main winding 508 are active and produce motive power. Therefore, the SRM serves as a two-phase SRM. This resembles a capacitor-start and capacitor-run single-phase induction motor. It should be noted that such a single-phase induction motor has two phase windings.

Various situations that arise in starting and running the two-phase SRM using power converter 500 will now be described. Also described below is a control technique that enables smooth starting and running of the two-phase SRM drive system regardless of the situation.

One situation that may occur within the SRM is that its rotor poles may align to face the stator poles. In this situation, turning off transistor switch 509 will cause the current flowing through main winding 508 to divert through diode 507, auxiliary capacitor 506, and dc source capacitor 503. The diverted current will charge auxiliary capacitor 506 as it passes through. As the voltage across auxiliary capacitor 506 rises to that of dc source voltage 510, auxiliary winding 505 will begin conducting a current. The current conducted through auxiliary winding 505, at this time, is due in part to the energy stored in auxiliary capacitor 506 and also in part to the current received from main winding 508. The current through auxiliary winding 505 will generate a force that tends to pull the rotor poles toward the auxiliary stator poles. Since the rotor poles face the main stator poles, in this situation, the energy stored in auxiliary capacitor 506 may not be enough to pull the rotor poles toward the stator poles, when this charge is applied to auxiliary winding 505. Therefore, the machine may not be started in this condition, without further effort.

This further effort may take the form of increasing the charge stored in auxiliary capacitor 506 during main winding 508's energization mode. When the transistor switch 509 is turned on, with the rotor poles facing the main stator poles, no torque is produced in the machine but the current in main winding 508 increases. When the main winding current has reached a nominal value (e.g., equal to the rated current), turning off transistor switch 509 will enable capacitor 506 to be highly charged through main winding 508's inductance. As auxiliary capacitor 506 is charged, the voltage across it increases significantly (i.e., by as much as the supply voltage), inducing a higher current to circulate through auxiliary winding 505. This current through auxiliary winding 505 generates sufficient torque to turn the rotor poles away from the main stator poles and toward the auxiliary stator poles. In this way, rotor movement is started and the rotor poles are positioned at their unaligned position, with respect to the main poles. When transistor switch 509 is subsequently switched on, the energization of main winding 508 produces sufficient torque to keep the rotor running.

Once start up is achieved, the regular running control of the machine is achieved by the periodic or occasional energization of main winding 508 to produce torque. The average torque produced by auxiliary winding 505 is zero, assuming that the current in auxiliary winding 505 is identical over its half rotor pitch angle. But this need not be the case in practice; the net torque can be positive, negative, or zero.

Transistor switch 509 may be regulated to produce positive net torque, in a rotor pitch angle, through auxiliary winding 505, if the energy transferred to auxiliary capacitor 506 is minimized while the current in main winding 508 is maintained until it has to be turned off completely. When the current in main winding 508 is completely turned off (i.e., commutated), the energy received by auxiliary capacitor 506 is maximized, resulting in a significant flow of current in auxiliary winding 505. This produces a torque which is additive to the torque produced by main winding 508, resulting in enhanced average torque for the motor.

The above-described functional cooperation between the single-switch controlled power converter 500 and the two-phase SRM may be used to provide a process for starting the SRM from standstill, regardless of the relative alignment between the rotor and stator poles. This control technique is described below.

Figure 5B:
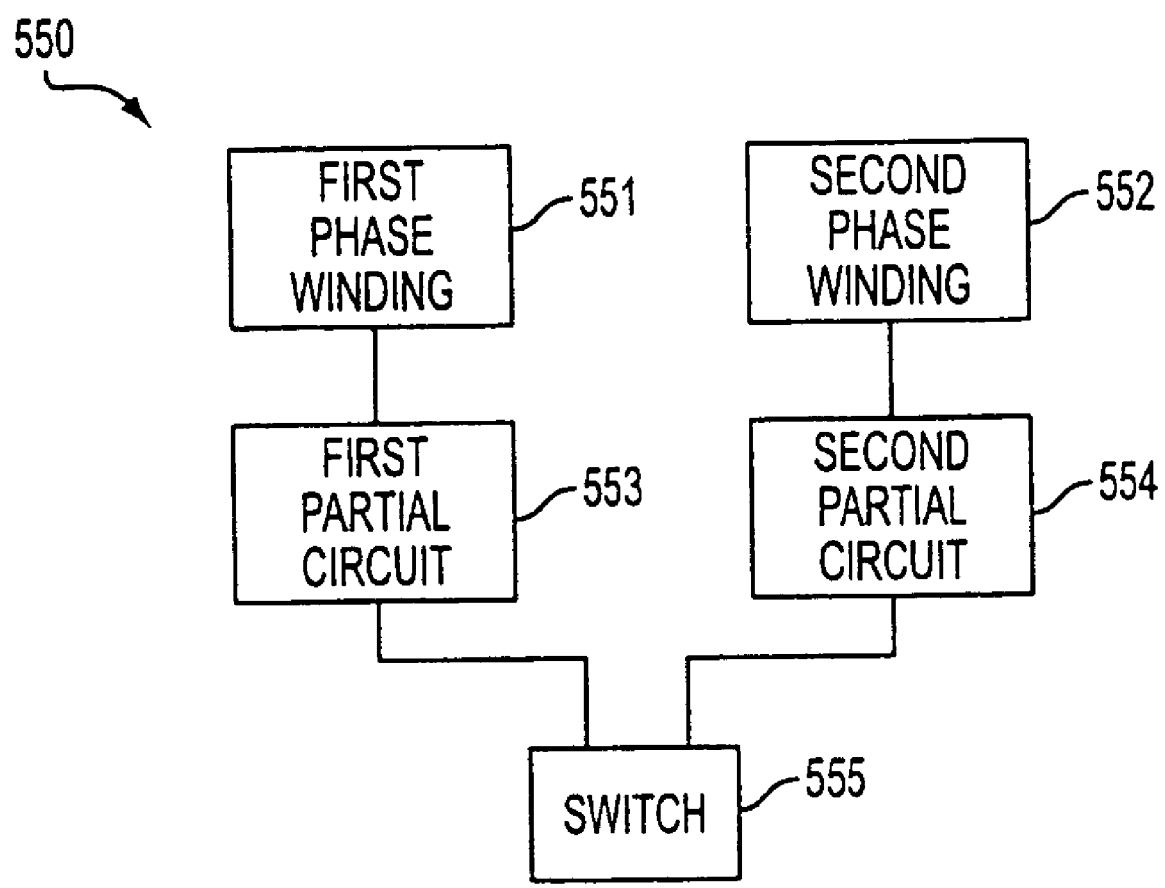
FIG. 5(b) illustrates a block diagram of a converter for an SRM or a PMBDCM motor.

FIG. 5(b) illustrates a block diagram of a converter for an SRM or a PMBDCM motor. The SRM or PMBDCM motor (not shown) has first and second phase windings 551 and 552, respectively. First and second partial circuits 553 and 554 form multiple conduction circuits in cooperation with the motor's first and second phase windings 551 and 552, respectively. A switch 555, connected to first and second partial circuits 553 and 554, opens and closes a first conduction circuit of the multiple conduction circuits, which includes the first phase winding, to regulate energization of the motor's first and second phase windings 551 and 552 and provide four-quadrant operation of the motor.

Figure 6:
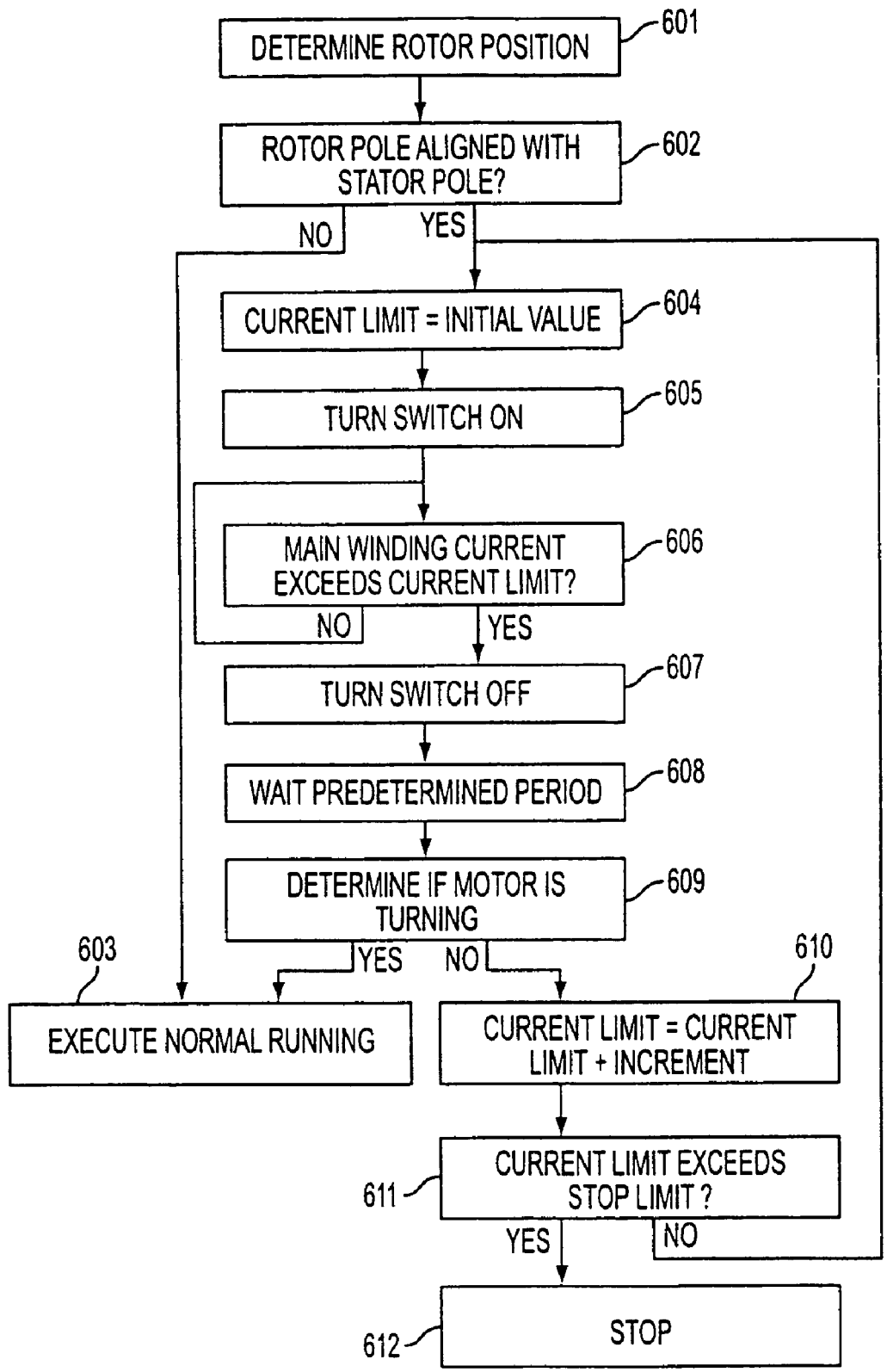
FIG. 6 illustrates a process for starting control of a two-phase SRM with a single-switch power converter.
Figure 7A:
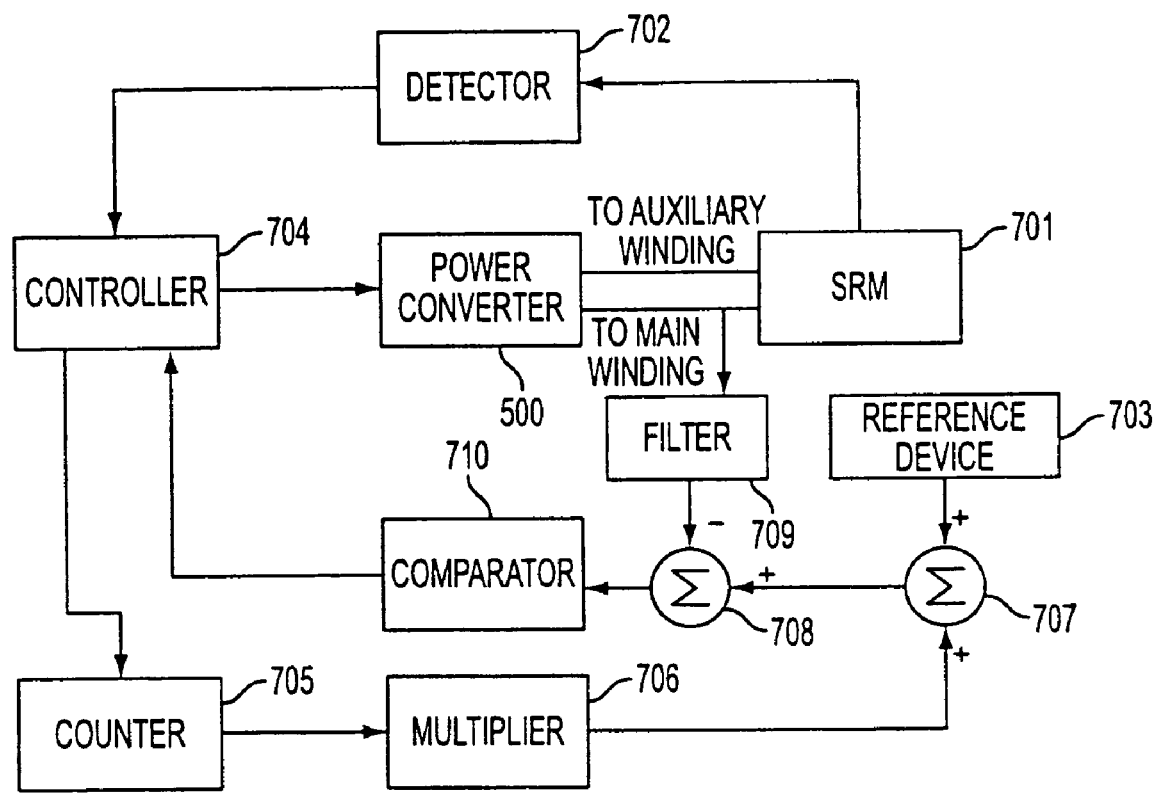
FIG. 7(a) illustrates a system for implementing the process illustrated by FIG. 6.
Figure 8:
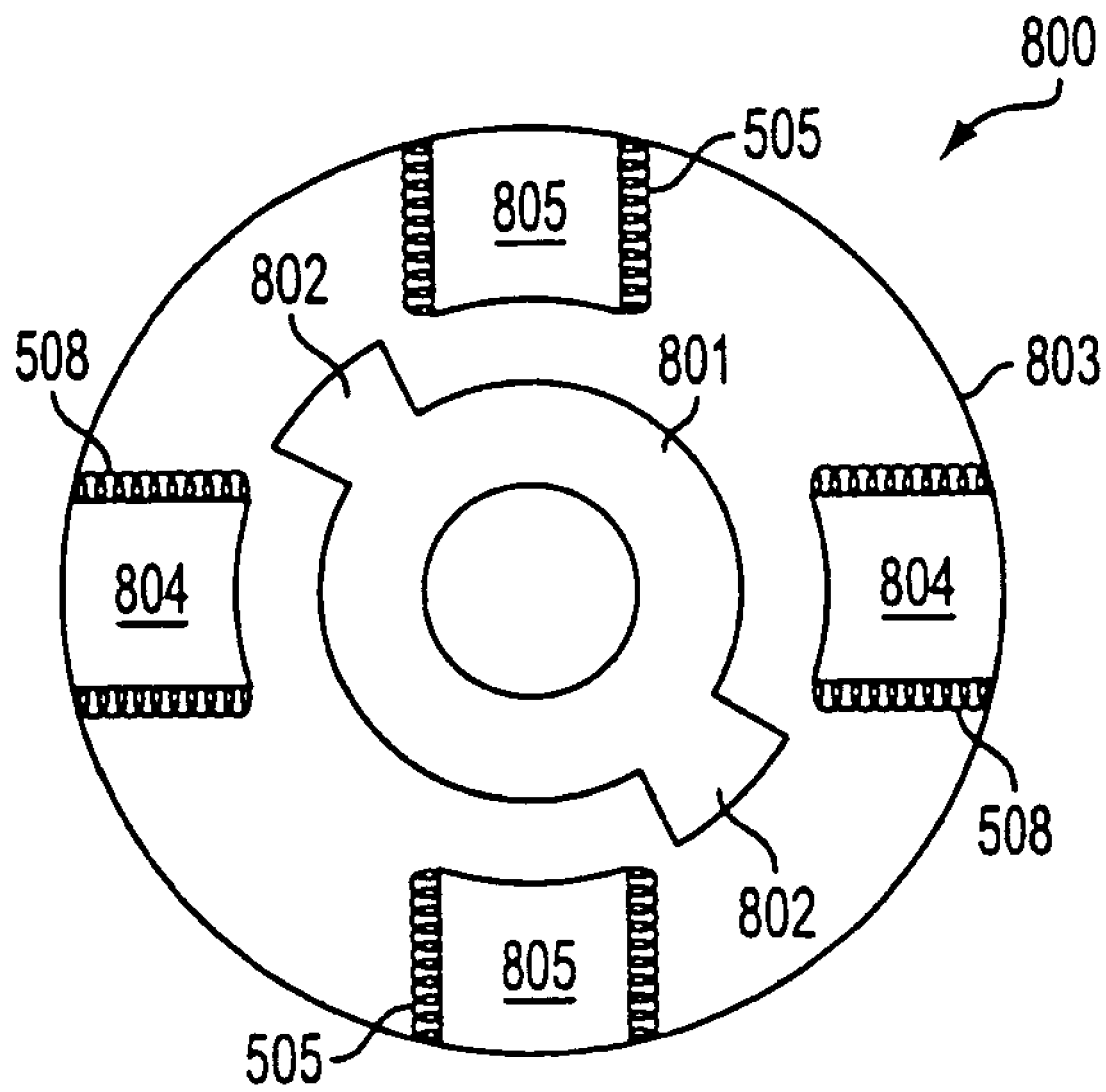
FIG. 8 illustrates a rotor and stator of a two-phase SRM with main and auxiliary windings wound on respective stator poles.

FIG. 6 illustrates a process for starting a two-phase SRM with a single-switch control power converter. FIG. 7(a) illustrates a system for implementing the process illustrated by FIG. 6. FIG. 8 illustrates a rotor and stator of a two-phase SRM motor with main and auxiliary windings wound on respective stator poles.

Referring to FIG. 8, a two-phase SRM motor 800 is shown having a rotor 801 and a stator 803. Rotor 801 has two salient poles 802, and stator 803 has four salient poles 804, 805. Stator poles 805 have auxiliary winding 505 wound around them, and stator poles 804 have main winding 508 wound around them.

Figure 7B:
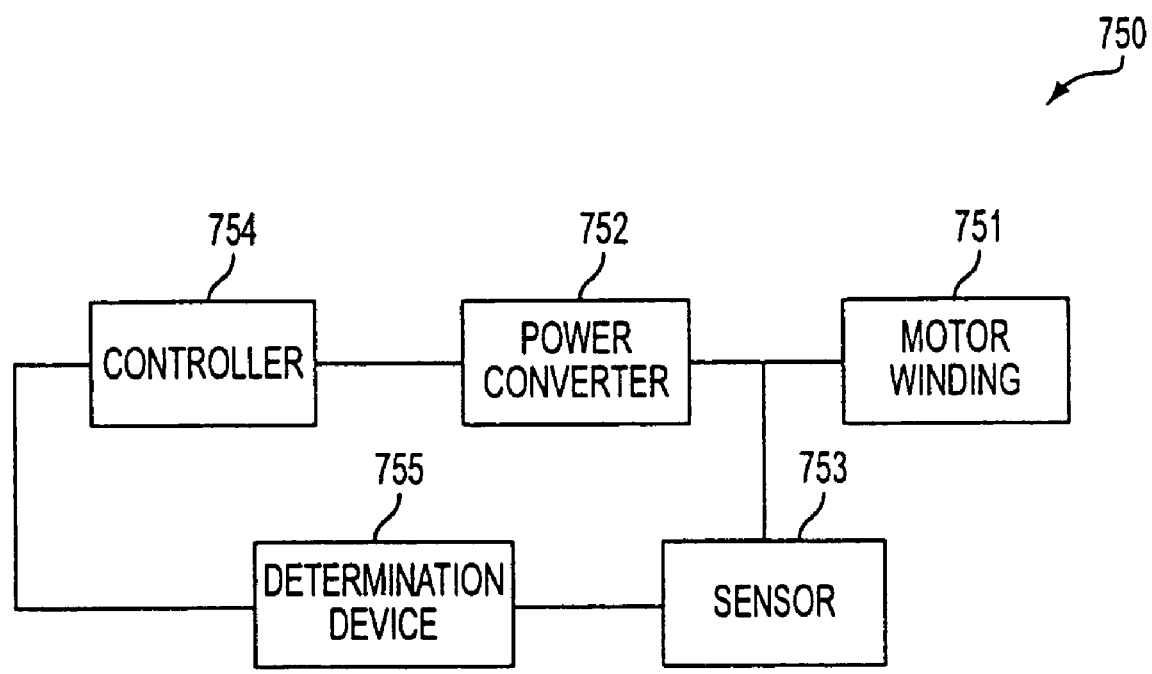
FIG. 7(b) illustrates a start-up controller for a multi-phase brushless direct current motor.

Referring now to FIGS. 6 and 7, the first step in the start-up procedure is to determine the rotor position (S601) of SRM 701, which includes motor 800 of FIG. 8, using a detector 702. The position of rotor 801 may be determined with a sensor-based or sensor-less detection device. If rotor poles 802 are determined to be out of alignment with main stator poles 804 (S602), then a normal operating procedure is executed (S603). On the other hand, if rotor poles 802 are determined to be aligned with main stator poles 804 (S602), then an initial current limit is set (S604) by a reference device 703 and transistor switch 509 of power converter 500 is turned on (S605) by a controller 704.

A counter 705 receives a signal from controller 704 each time transistor switch 509 is turned on. Using this signal, counter 705 maintains a count identifying the number of times transistor switch 509 has been turned on previously during the start-up procedure. This count is provided to multiplier 706 where it is multiplied by a current incrementing value, such as 0.25. Summer 707 adds the multiplication product provided by multiplier 706 to the initial current limit provided by reference device 703, and the sum is provided to a summer 708.

A filter 709 receives a signal provided by power converter 500 to main winding 508, filters this signal, and provides this signal to summer 708. Summer 708 adds the sum received from summer 707 to the negative of the filtered signal received from filter 709 and provides the sum to a comparator 710. Comparator 710 continuously or occasionally determines whether the value received from summer 708 exceeds the current limit (S606), based on the value of the sum received from summer 708. When the sum value received from summer 708 exceeds the current limit, comparator 710 sends a signal to controller 704 indicating this condition, and controller 704 turns transistor switch 509 off (S607) in response to the signal.

Thereafter, controller 704 waits a period of time (S608), such as between 0.1 and 0.2 seconds, before making a determination as to whether rotor 801 of SRM 701 is rotating (S609). This determination is made based on the signal information received from detector 702 regarding the detected rotor position. If rotor 801 is determined to be rotating (S609), then the normal running operation of SRM 701 is executed (S603). Otherwise, counter 705, multiplier 706, and summer 707 cooperate to increment the current limit by the current incrementing value (S610), through the influence of controller 704, and controller 704 determines whether the incremented current limit exceeds a stop limit value (S611). If the stop limit value is exceeded, execution of the start-up procedure stops (S612). Otherwise, the start-up procedure cycles through steps S605 to S611, as described above, until rotor 801 begins turning or the procedure stops due to the establishment of an excessive current limit.

Once SRM 701 is started up, the normal running control involves turning on transistor switch 509 when rotor poles 802 are unaligned, with respect to the main stator poles 804, and turning off transistor switch 509 just before or at the complete alignment of the main stator and rotor poles 804 and 802, respectively.

The start-up procedure and system discussed above may be similarly used in conjunction with any of the power converter embodiments described herein. Also, as described below, each of the power converter embodiments described hereinafter provides four-quadrant operation, though this feature is only described in connection with power converter 500 for brevity.

Power converter 500 can provide four-quadrant operation of the two-phase SRM. This operation is provided in the following way.

Assume the intended direction of rotation for rotor 801 is clockwise (CW). Main winding 508 on main stator poles 804 is energized with a current, and this current is commutated when the rotor and main stator poles 802, 804 align or are close to alignment. During this energization period, the inductance slope of main winding 508 is positive. Hence, the torque produced is positive and in the direction of rotor 801's movement. Assuming that a CW rotation is positive, motor 800 is delivering positive output power (i.e., motoring torque). In other words, when the torque and speed are positive, so too is the power output of motor 800. This condition indicates quadrant one operation.

For quadrant four operation, the torque has to be negative when the speed is positive. As a result, motor 800 delivers negative power in quadrant four operation. That is, the power is taken from SRM 701 and fed to dc source capacitor 503. This is called regeneration in the CW direction of rotation. In order to produce negative torque, the current in main winding 508 is injected when rotor poles 802 move away from alignment with respect to main stator poles 804.

For quadrant three operation, rotor 801 rotates in the counter CW (CCW) direction and torque is applied in this direction, resulting in negative speed and negative torque and contributing to positive power. Therefore, this is motoring in the reverse direction. Reverse direction motoring is achieved by energizing main winding 508 when rotor poles 802 start to move CCW from a completely unaligned position with respect to main stator poles 804. The current is commutated in main winding 508 when the rotor and main stator poles 802, 804 align or are near alignment.

Quadrant two operation is very similar to that of quadrant four, but the torque is positive (CW) and the speed is negative (CCW). Quadrant two operation, therefore, provides negative output power. This is regeneration in the CCW direction of rotation and is realized by energizing main winding 508 with a current when rotor poles 802 start moving CCW away from alignment with main stator poles 804.

This discussion exemplifies that power converter 500 can provide a full four-quadrant two-phase SRM drive system. The control for such operation has been described in the foregoing.

One of the areas where the cost of the power converter and its control can be minimized is in the current and rotor position sensors. The current sensor is required to sense the current in the main winding and to compare this current to a desired value, such as a reference current. The comparison can be performed by a difference circuit that produces an error current equivalent to the difference between the desired current and the instantaneous winding current. This current error is amplified and conditioned with a proportional and integral controller (popularly known as PI current controller), and the resulting output is compared to a train of triangular carrier pulses of fixed frequency. The intersections of the current controller output and the carrier pulses determine the turn on and turn off duration for the power converter's transistor switch.

FIG. 7(*b*) illustrates a start-up controller for a direct current motor. Start-up controller 750 includes a power converter 752 having a controllable switch (not shown) that provides current to a winding 751 of the multi-phase brushless dc motor (not shown). A sensor 753 detects an indication of the amount of current provided to motor winding 751 by power converter 752 and outputs this indication in a first signal. A determination device 755 determines, based on the first signal, whether the amount of current provided to motor winding 751 exceeds a threshold value and outputs an indication of this determination in a second signal. A controller 754 controls the controllable switch, in accordance with the second signal, by turning the controllable switch on to provide current to motor winding 751 and turning the controllable switch off to stop providing current to motor winding 751.

Figure 9:
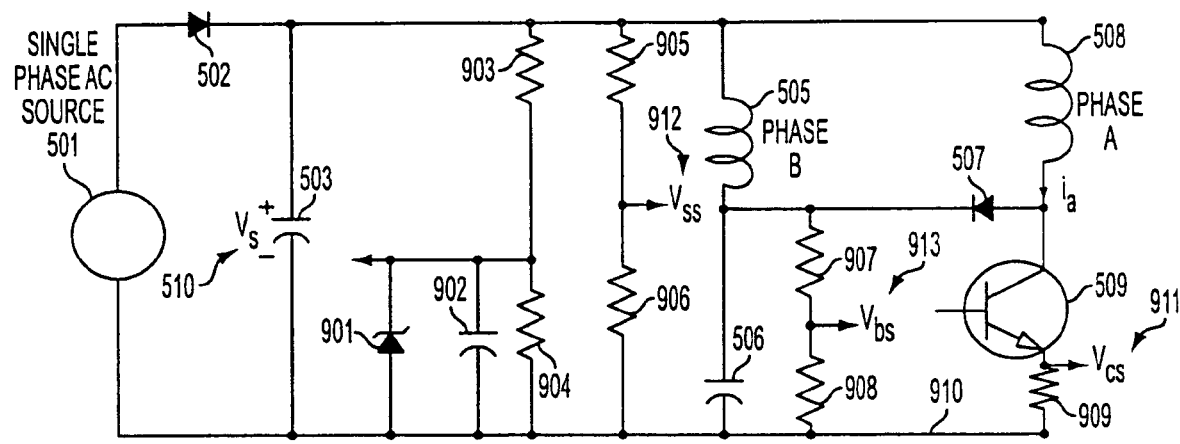
FIG. 9 illustrates the one-switch power converter topology of FIG. 5(a) with current sensing and logic power supply generation for the two-phase SRM drive system.

FIG. 9 illustrates the one-switch power converter topology of FIG. 5(*a*) with current sensing and logic power supply generation for the two-phase SRM drive system. Current sensing can be achieved with Hall-effect current sensors that provide galvanic isolation between the power circuit and control circuit. However, this is not required, here, as there is only one transistor to be activated. Hence, the current can be inexpensively sensed using one sensing resistor 909 in series with the emitter of transistor switch 509.

When transistor switch 509 is on, current flows in sensing resistor 909, causing a voltage drop 911 across it that is measured with reference to a common terminal 910. Voltage 911 provides a signal that is representative of the current in main winding 508 when transistor switch 509 is turned on.

Many times, a measure of main winding 508's current is needed only during the conduction interval of transistor switch 509. During the non-conduction interval, no control is-exercised over the current except to stop its flow through transistor switch 509. A pulse width modulation controller, such as controller 704, generates a fixed conduction time and a fixed non-conduction time for transistor switch 509, known as on time and off time, respectively, for a fixed pulse width modulation frequency. Additional information regarding current sensing and modulating the SRM motor speed and output power can be gleaned from "Switched Reluctance Motor Drives", R. Krishnan, CRC Press, June 2001. Of importance here, is that power converter 500 lends itself to non-isolated current sensing and control.

Similarly, a rotor position sensor is required to sense the position of rotor poles 802 with respect to stator poles 804, 805. This positional information is used to determine when main winding 508 has to be energized by turning on transistor 509.

The rotor position can be sensed using a mechanically mounted optical encoder, but this is expensive and, therefore, unacceptable in many low-cost applications. Furthermore, mechanical position sensors can be unreliable.

Another way the rotor position can be sensed is by estimating the main winding or auxiliary winding instantaneous inductance, which is a function of their respective currents and the rotor position. Therefore, the rotor position can be determined by estimating or sensing the current and inductance of auxiliary winding 505.

To determine its inductance, the applied voltage to auxiliary winding 505 must be known. The applied voltage is obtained from sensing resistors 905 and 906, which are placed across dc source 510, and resistors 907 and 908, which are placed across auxiliary capacitor 506. The respective signal outputs of these two sensing resistor pairs, with respect to common terminal 910, are $V_{ss}$ 912 and $V_{bs}$ 913. The difference between signal voltages $V_{ss}$ 912 and $V_{bs}$ 913 identifies the applied voltage to main winding 508, during the non-conduction period of transistor switch 509. During transistor 509's conduction period, signal voltage $V_{ss}$ 912 identifies the applied voltage across main winding 508. Similarly, the signal voltage across auxiliary winding 505 is determined from the difference between $V_{ss}$ 912 and $V_{bs}$ 913. All these signals are obtained with reference to common terminal 910.

The gate drive and control circuits require a logic-level power supply at 5 to 15 V, often one at 5 V and the other at 15 V. The logic-level power supply is obtained from dc source 510 by a resistor-divider connection, formed by resistors 903 and 904. The specific power supply voltage requirement determines the ratio that must exist between the respective resistances of resistors 903 and 904. The relationship between voltage and the ratio of resistances forming the resistor-divider is well known to those skilled in the art.

The energy required for the control circuits is stored in a capacitor 902, which is connected across resistor 904. Capacitor 902 also serves as a filter. To maintain the voltage of the logic power supply at its desired value, a Zener diode 901 is connected across capacitor 902. Since the power supply voltage is referenced to common terminal 910, all of the control and power circuits have the same common terminal 910, thereby eliminating the need for an isolated power supply in this power converter arrangement.

Figure 10:
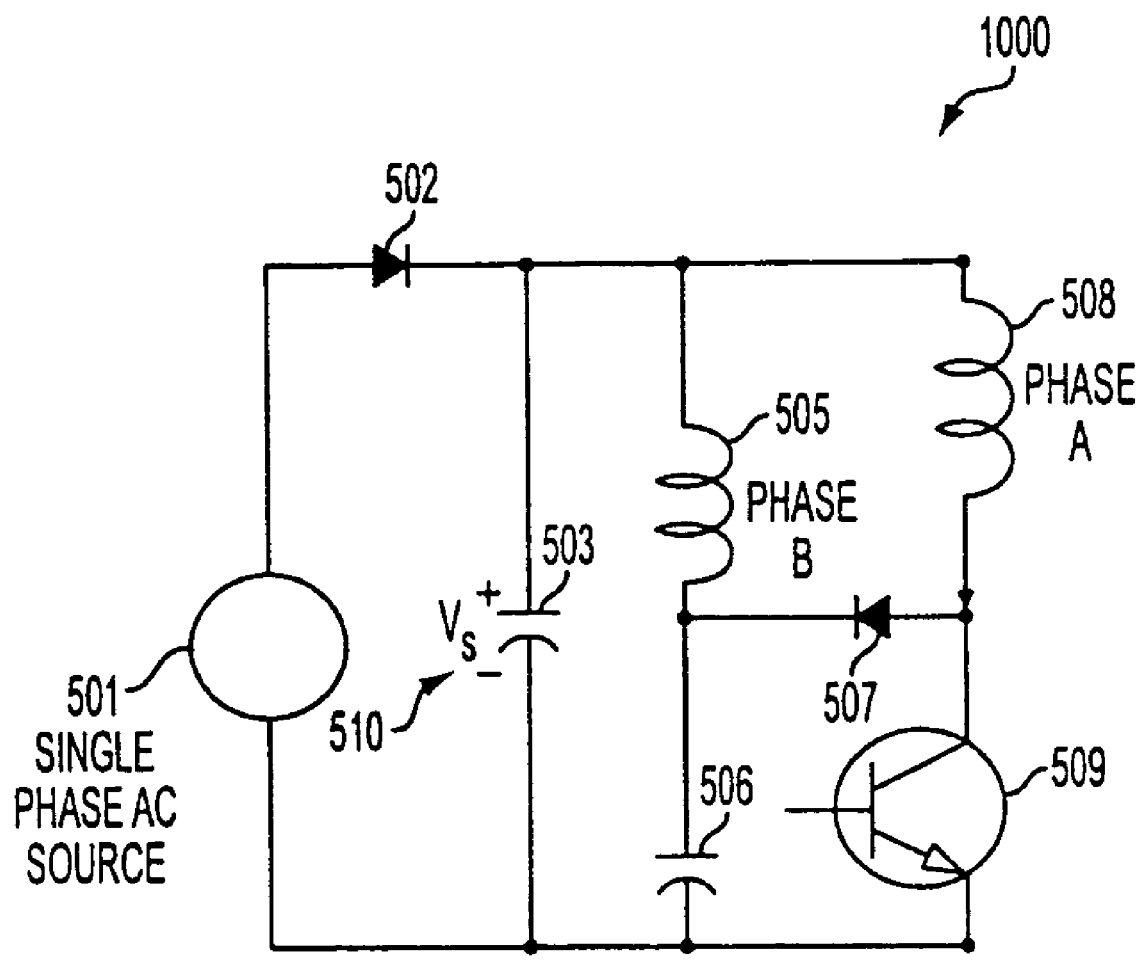
FIG. 10 illustrates the two-phase SRM power converter circuit of FIG. 5(a) without a series diode in the auxiliary winding.

FIG. 10 illustrates the two-phase SRM power converter circuit of FIG. 5(*a*) without a series diode in the auxiliary winding. As may be seen by inspection, the circuit of FIG. 10 is identical to that illustrated by FIG. 5(*a*), except for the absence of diode 504 in power converter 1000. Therefore, the circuit elements of FIG. 10 are identified by the same reference characters used in FIG. 5(*a*). Since the operation of power converter 1000 is similar to that of FIG. 5(*a*), only the differences in operation will be described in detail here. A description of the operating characteristics common to both power converters 500 and 1000 is provided above in connection with the description of power converter 500.

The absence of diode 504 in power converter 1000 allows auxiliary capacitor 506 to be charged by auxiliary winding 505 and the snubbing energy of main winding 508. The simultaneous flow of current through both auxiliary and main windings 505 and 508 tends to keep rotor 801 in the same place, or at least more aligned with main stator poles 804 than with auxiliary stator poles 805. But this tendency is overcome by the starting technique described earlier in connection with FIGS. 6 and 7. Therefore, power converter 1000 omits diode 504 without any serious consequences in SRM drive operation, and the advantage of having fewer power devices is very critical in cost limiting applications.

Figure 11:
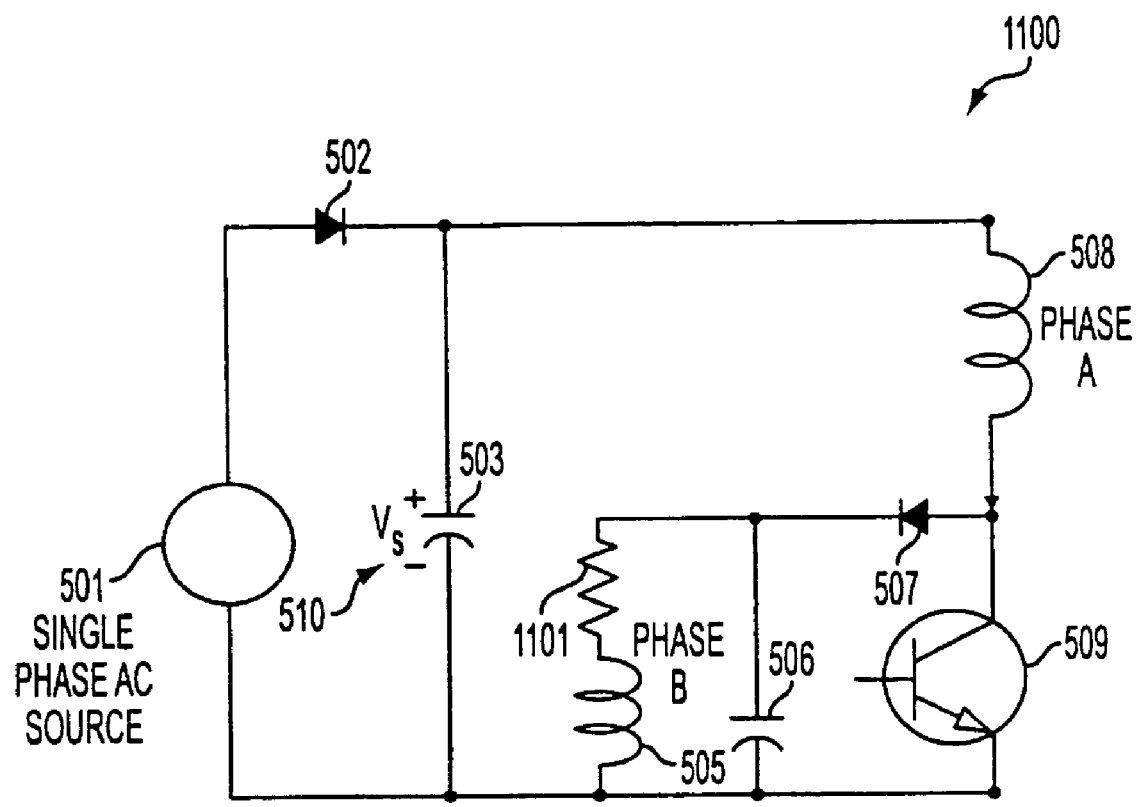
FIG. 11 illustrates a two-phase SRM power converter in which only snubbing energy is provided to its auxiliary windings.

FIG. 11 illustrates a two-phase SRM power converter in which only snubbing energy is provided to its auxiliary winding. The power converter of FIG. 11 has similar circuit elements to that illustrated by FIG. 5(*a*), and these similar circuit elements are identified by the same reference characters. Also, the operation of power converter 1100 has similarities to the operation of power converter 500. Therefore, only the operational differences between power converters 1100 and 500 will be described in detail here. A description of the operating characteristics common to both power converters 1100 and 500 is provided above in connection with the description of power converter 500.

Power converter 1100 has the same power device count as controller 1000, but is configured such that the energy from the commutation of the current in main winding 508 is fed to auxiliary capacitor 506 and thereafter released to auxiliary winding 505. The energy stored in auxiliary capacitor 506 for consumption in auxiliary phase 505 is high. Therefore, some of this energy is dissipated by a resistor 1101 that is placed in series with auxiliary winding 505 and placed in parallel with auxiliary capacitor 506. Since a part of the energy stored in auxiliary capacitor 506 is not returned to dc source capacitor 503, as occurs in power converters 500 and 1000, the system may suffer from lower efficiency. But this is not critical in many low-cost applications.

Figure 12:
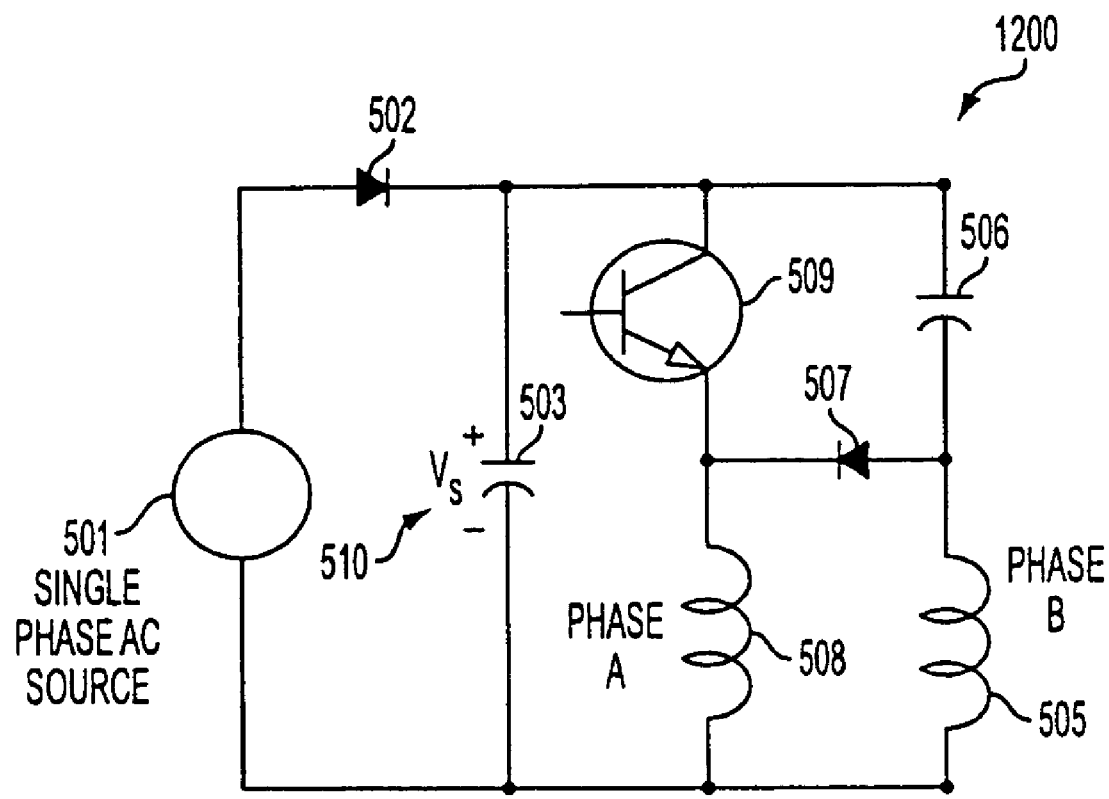
FIG. 12 illustrates a variation of the power converter illustrated by FIG. 10 in which the transistor switch and auxiliary capacitor are connected to the dc source rail, rather than the common rail.

FIG. 12 illustrates a variation of the power converter illustrated by FIG. 10 in which the transistor switch and auxiliary capacitor are connected to the dc source rail, rather than the common rail. The power converter of FIG. 12 has similar circuit elements to that illustrated by FIG. 10, and these similar circuit elements are identified by the same reference characters. Also, the operation of power converter 1200 has similarities to the operation of power converter 1000. Therefore, only the operational differences between power converters 1200 and 1000 will be described in detail here. A description of the operating characteristics common to both power converters 1200 and 1000 is provided above in connection with the description of power converter 1000.

By connecting main and auxiliary windings 508 and 505 to the common rail and connecting transistor switch 509 and auxiliary capacitor 506 to the higher potential rail of dc source 510, the functionality and working of the circuit remains the same as described for power converter 1000. However, current sensing is easier to achieve with power converter 1200 at all times, including the non-conduction intervals of transistor switch 509. This is because the sensing may be done without isolating the sensor (not shown) from the power circuit. With power converter 1200, though, the gate drive circuit (not shown) for transistor switch 509 has to be isolated, but this can be overcome using a charge-pump circuit.

FIGS. 13(*a*)–(*d*) illustrate two-phase SRM power converters that each have a single controllable switch and a single capacitor. Each of these power converters have similar circuit elements to the power converter illustrated by FIG. 5(a), and these similar circuit elements are identified by the same reference characters. Also, the operation of each of power converters 1300–1303 has similarities to the operation of power converter 500. Therefore, only the operational differences between power converters 1300–1303 and 500 will be described in detail here. A description of the operating characteristics common to power converters 1300–1303 and 500 is provided above in connection with the description of power converter 500.

Each of power converters 1300–1303 employ a single capacitor to provide a dc source and feed current to auxiliary winding 505. Power converter 500 uses two capacitors, one to provide a stabilized dc source 510 and the other to provide energy storage for the commutating energy of main winding 508 and thereafter recycle this energy to dc source 510 through the energization of auxiliary winding 505. Power converters 1300–1303 omit the dc source capacitor, thereby allowing all of the capacitance to reside in auxiliary capacitors 506.

Power converters 1300 and 1301 are similar to each other, except the inclusion of optional diode 504 in power converter 1300 blocks the charging of auxiliary capacitor 506 through auxiliary winding 505. Therefore, the operation of these circuits will be described only by reference to power converter 1301. One skilled in the art will understand how this description relates to power converter 1300.

Upon energizing single phase ac source 501, the positively rectified voltage provided by rectifier diode 502 is applied in parallel to auxiliary winding 505 and the series connection of main winding 508 and diode 507. The currents flowing through these parallel paths charge auxiliary capacitor 506. Once a steady state condition is reached in the circuit, which occurs soon after the application of power through single phase ac source 501, the operational mode may begin.

In the operational mode, main winding 508 is energized by turning on transistor switch 509. Turning on transistor switch 509 closes an electrical circuit containing auxiliary capacitor 506, auxiliary winding 505, main winding 508, and transistor switch 509. Current will flow in main winding 508 and sometimes in auxiliary winding 505, depending on the voltage provided by single-phase ac source 501 at a specific instant. If the voltage across auxiliary capacitor 506 is less than the rectified single-phase ac source voltage at some instant, then single-phase ac source 501 supplies energy to main winding 508 and also to auxiliary winding 505, which charges auxiliary capacitor 506. If the voltage across auxiliary capacitor 506 is less than the rectified ac source voltage, then main winding 508 will have the source voltage across it, while auxiliary winding 505 will have the difference between the voltage across auxiliary capacitor 506 and the ac source voltage applied to it. As a result, current flows in auxiliary winding 505.

By controlling the time duration of conduction in transistor switch 509, the energy flow to main winding 508 is controlled. Accordingly, the torque, speed and, hence, power output of the machine is controlled. When the current in main winding 508 is commutated by turning off transistor switch 509, the energy in main winding 508 is transferred to auxiliary capacitor 506 and partially converted to output mechanical power. Some of the mechanical power may be transferred back to energy in auxiliary winding 505. Therefore, the current turn off in main winding 508 is safely handled.

Control circuits 1302 and 1303 are similar to control circuits 1300 and 1301 except that transistor switch 509 and auxiliary capacitor 506 are tied to the higher potential dc rail, instead of the lower dc rail. The functionality and operation of these circuits are similar to those of power converter 1200 and may be understood by reference to the description provided for FIG. 12. Power converters 1300–1303 provide the advantages of: (a) using only one capacitor instead of two, (b) saving space in the power circuit packaging, (c) reducing component and assembly costs, and (d) soft charging the auxiliary capacitor, since it is connected through phase windings all the time, to extend its life. Features (a) and (d) provide the attendant advantage of increased reliability for the power converter.

Figure 14A:
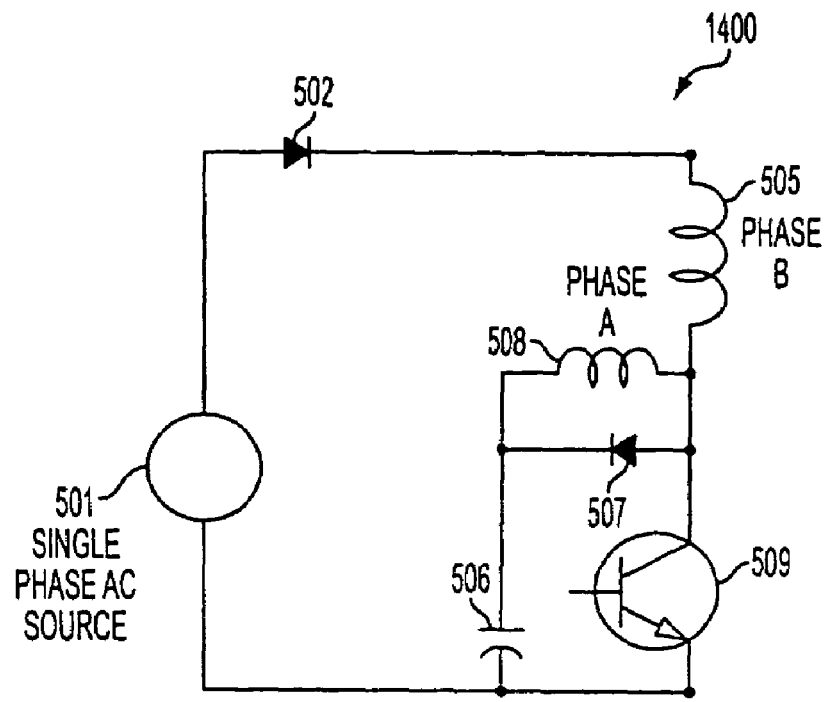
FIGS. 14(a) and 14(b) illustrate a two-phase SRM power converter that uses freewheeling current decay in one phase winding of the machine.
Figure 14B:
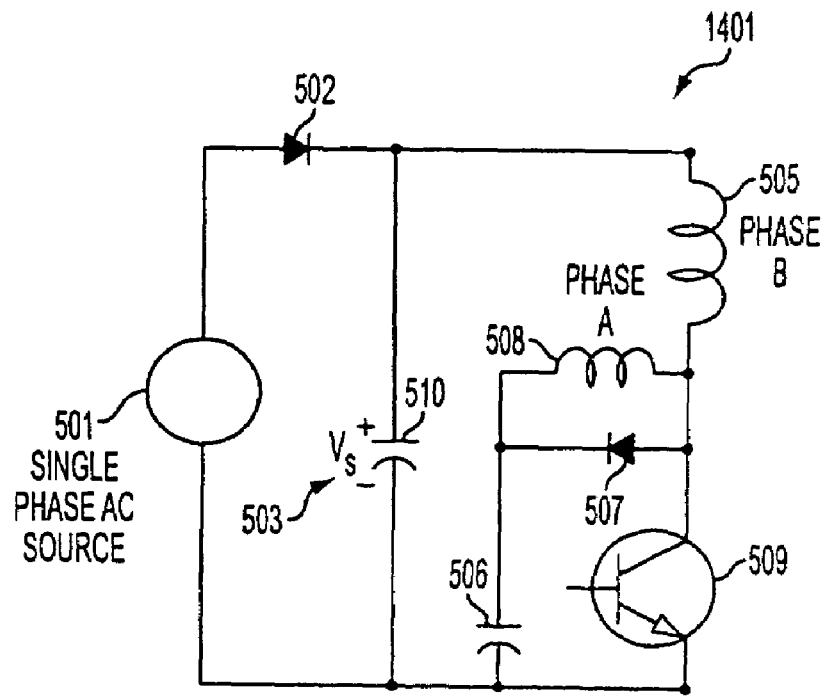

FIGS. 14(a) and 14(b) illustrate a two-phase SRM power converter that uses freewheeling current decay in one phase winding of the machine. The power converters of FIGS. 14(a) and (b) have similar circuit elements to the power converter illustrated by FIG. 5(a), and these similar circuit elements are identified by the same reference characters. Also, the operation of each of power converters 1400 and 1401 has similarities to the operation of power converter 500. Therefore, only the operational differences between power converters 1400, 1401 and power converter 500 will be described in detail here. A description of the operating characteristics common to power converters 1400, 1401, and 500 is provided above in connection with the description of power converter 500.

Power converters 1400 and 1401 differ from the previously described power converters in that freewheeling current decay is employed in one phase of the machines, instead of the current decay obtained from the dc source voltage or its difference from the auxiliary capacitor voltage. Power converters 1400 and 1401 are similar to each other except that control circuit 1400 omits dc source capacitor 503. Therefore, the operation of these circuits will be described only by reference to power converter 1400. One skilled in the art will understand how this description relates to power converter 1401.

Upon energizing control circuit 1400 with voltage from single-phase ac source 501, with transistor switch 509 off, a current flows through auxiliary winding 505, diode 507, and auxiliary capacitor 506. This current charges auxiliary capacitor 506 so that it holds a voltage nearly twice the level of the ac source voltage. After auxiliary capacitor 506 is fully charged, current conduction through auxiliary winding 505 ceases. While transistor switch 509 is turned off, no current flows through main winding 508.

When transistor switch 509 is turned on, the full amount of the rectified ac source voltage is applied across auxiliary winding 505. Simultaneously, the voltage across auxiliary capacitor 506 is applied across main winding 508. Therefore, turning transistor switch 509 on establishes a current in both auxiliary winding 505 and main winding 508.

Turning off transistor switch 509 allows current in auxiliary winding 505 to flow through auxiliary capacitor 506. The current flowing through auxiliary capacitor 506 generates a negative voltage across auxiliary winding 505 that is equal to the difference between the voltage across auxiliary capacitor 506 and the rectified ac source voltage. Since the voltage developed across auxiliary winding 505 is generally less than the voltage across auxiliary capacitor 506, a faster current decay in auxiliary winding 505 is possible.

Also, when transistor switch 509 is turned off, the main winding current is diverted from transistor switch 509 by diode 507 and main winding 508, itself. This results in a zero voltage potential being applied across main winding 509 and the current decay therein.

By turning transistor switch 509 on and off, the current through auxiliary winding 505 is controlled to improve the ac input power factor and obtain a sinusoidal current flow. The commutation rate of main winding 508 is regulated to provide adequate time for the current in it to cease flowing.

Power converter 1400 has only one capacitor and, therefore, lends itself to low-cost construction. Power converter 1400 provides the additional advantages of power factor correction and sinusoidal shaping of the input ac current. These latter two features help improve the SRM's compliance with electromagnetic interference (EMI) and radio frequency interference (RFI) regulations. A unity power factor is achievable with power converter 1400, for example. Furthermore, power converter 1400 provides substantially harmonic-free operation in the low frequency range. Power converter 1401, illustrated in FIG. 14(b), is similar to power converter 1400 but includes dc source capacitor 503. The inclusion of dc source capacitor 503 prevents power converter 1401 from having the power factor correction and ac current wave shaping capabilities offered by power converter 1400, but allows power converter 1400 to adequately charge auxiliary capacitor 506 with short duty cycles of transistor switch 509's operation. This feature is achievable because dc source voltage 510, provided by dc source capacitor 503, is constant instead of a varying sinusoid. As a result, it is easier to control the application and decay of current in main winding 508, thereby providing a more efficient overall operation of the motor drive.

Figure 15:
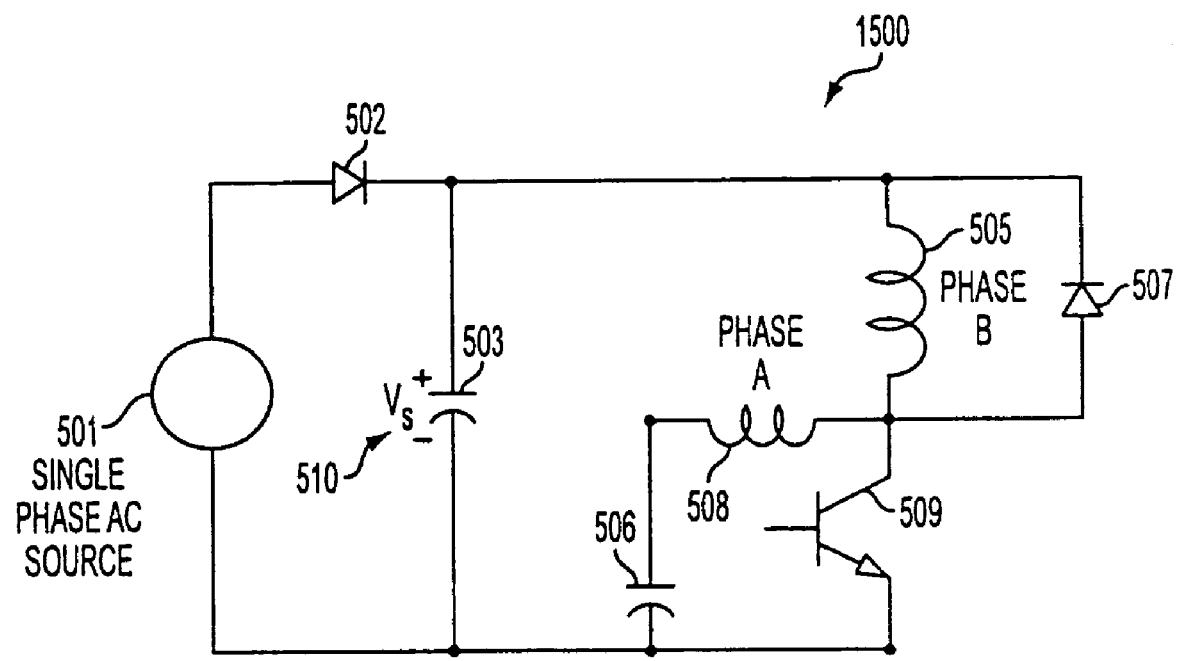
FIG. 15 illustrates a two-phase SRM power converter that provides freewheeling current decay in an auxiliary winding of the machine.

FIG. 15 illustrates a two-phase SRM power converter that provides freewheeling current decay in an auxiliary winding of the machine. The power converter of FIG. 15 has similar circuit elements to the power converter illustrated by FIG. 14(b), and these similar circuit elements are identified by the same reference characters. Also, the operation of power converter 1500 has similarities to the operation of power converter 1401. Therefore, only the operational differences between power converter 1500 and power converter 1401 will be described in detail here. A description of the operating characteristics common to both power converters 1500 and 1401 is provided above in connection with the description of power converter 1401.

Power converter 1500 differs from power converter 1401 in that diode 507 is placed across auxiliary winding 505, with its anode connected to the positive dc source rail. By contrast, diode 507 of power converter 1401 was connected across main winding 509. As a result, power converter 1500 provides controlled current decay in main winding 509, using the dc source and auxiliary capacitors 503 and 506, respectively, and diode 507 provides freewheeling current decay in auxiliary winding 505.

Figure 16:
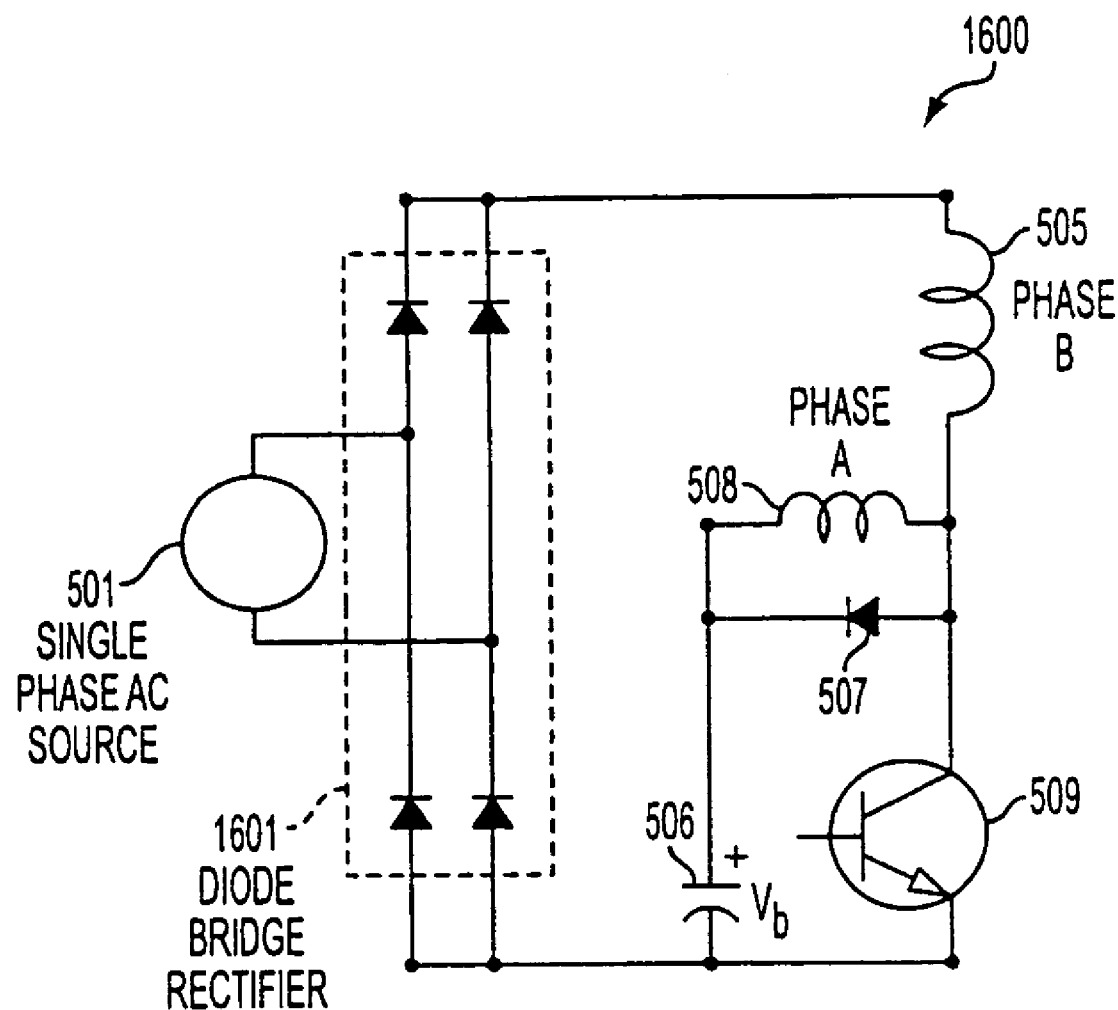
FIG. 16 illustrates a two-phase SRM power converter providing power factor correction and sinusoidal input current shaping on the ac-side of the power converter.

FIG. 16 illustrates a two-phase SRM power converter providing power factor correction and sinusoidal input current shaping on the ac-side of the power converter. A unity power factor is achievable with power converter 1600, for example. The power converter of FIG. 16 has similar circuit elements to the power converter illustrated by FIG. 14(a), and these similar circuit elements are identified by the same reference characters. Also, the operation of power converter 1600 has similarities to the operation of power converter 1400. Therefore, only the operational differences between power converter 1600 and power converter 1400 will be described in detail here. A description of the operating characteristics common to both power converters 1600 and 1400 is provided above in connection with the description of power converter 1400.

Power converter 1600 differs from power converter 1400 in that a full-wave bridge rectifier 1601 is substituted for rectifier diode 502 of power converter 1400. Since the ac voltage is fully rectified, both positive and negative half cycles, the input current is shaped to a sinusoid by the cooperative action of transistor switch 509 and auxiliary winding 505, in a manner similar to that described earlier in connection with circuit controller 1400.

Figure 17A:
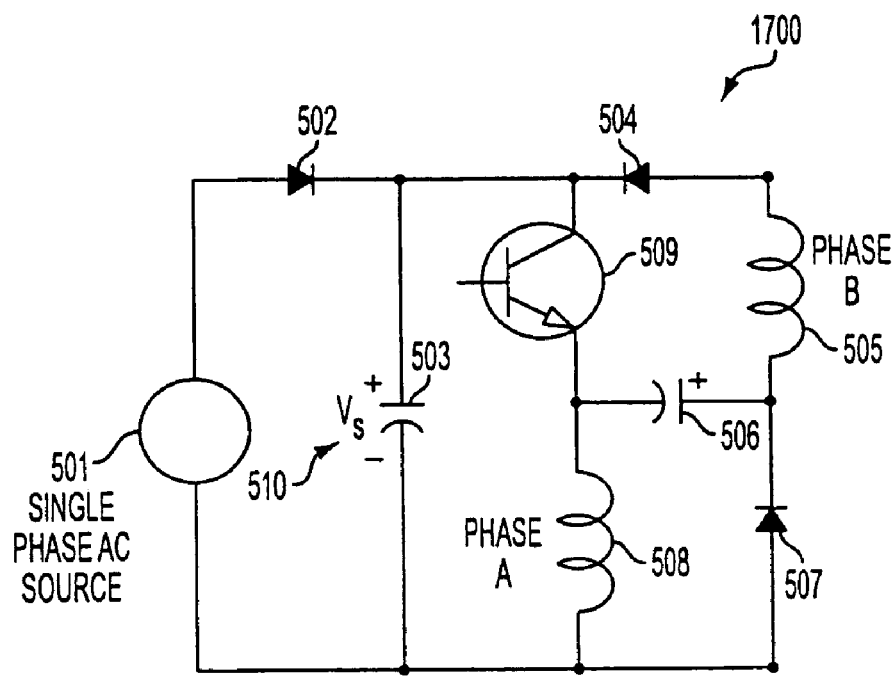
FIGS. 17(a) and 17(b) each illustrate a two-phase SRM power converter that provides simultaneous active control of both machine phases, with one phase in a buck-boost configuration.
Figure 17B:
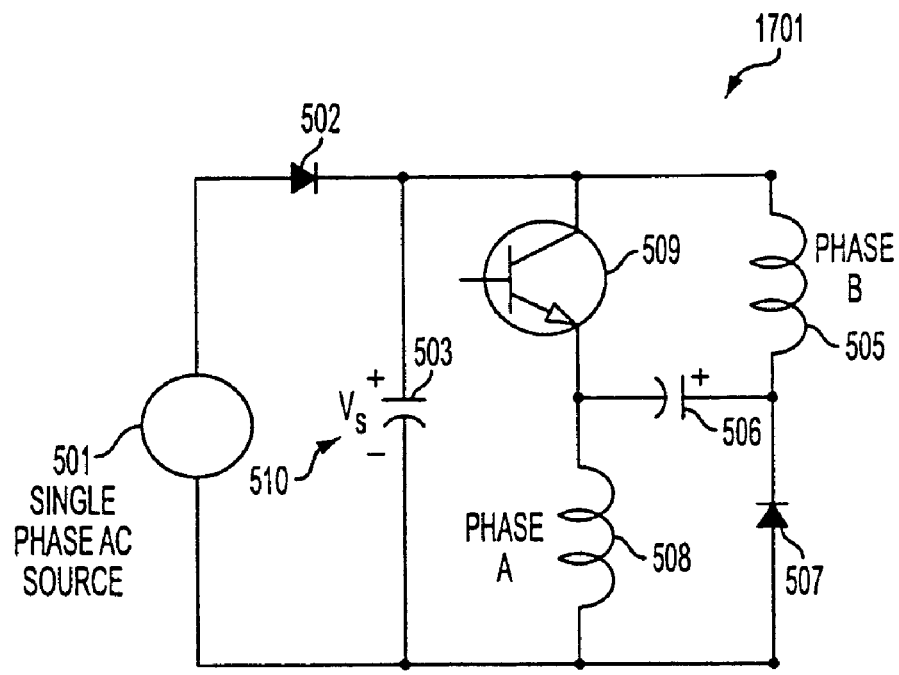

FIGS. 17(a) and 17(b) each illustrate a two-phase SRM power converter that provides simultaneous active control of both machine phases, with one phase in a buck-boost configuration. The power converters of FIGS. 17(a) and 17(b) have similar circuit elements to the power converters described previously, and these similar circuit elements are identified by the same reference characters. Also, the operation of each of power converters 1700 and 1701 has similarities to the operation of these other power converters. Therefore, only the operational differences between power converters 1700, 1701 and the previously described power converters will be described in detail here. A description of the common operating characteristics is provided above.

Referring now to FIG. 17(a), auxiliary capacitor 506 is charged by turning on transistor switch 509 to let a current flow through main winding 508 and dc source capacitor 503. Diode 504 blocks the charging of auxiliary capacitor 506 through auxiliary winding 505 at all times. Turning off transistor switch 509 diverts the commutated current through auxiliary capacitor 506, with the current loop consisting of main winding 508, diode 507, and auxiliary capacitor 506. Thus, auxiliary capacitor 506 is charged with the polarity shown by the "+" sign in FIG. 17(a). If auxiliary capacitor 506's voltage is greater than source voltage 510, then current conduction is enabled through auxiliary winding 505 when transistor switch 509 is turned on next time. Therefore, the currents through auxiliary winding 505 and main winding 508 are controlled by transistor switch 509.

Power converter 1701, illustrated in FIG. 17(b), differs from power converter 1700 in that it omits diode 504. Main winding 508 is operated in the buck-boost mode, and hence auxiliary capacitor 506's voltage $V_b$ 511 can be varied from very low values to more than twice dc source voltage $V_s$ 510, if necessary. This feature provides a very good and variable voltage to apply to main winding 508 and its control.

FIGS. 18(a)–(c) illustrate two-phase SRM power converters with active control applied mostly to one phase. The power converters of FIGS. 18(a)–(c) have similar circuit elements to the power converters illustrated by FIGS. 14(a) and(b), and these similar circuit elements are identified by the same reference characters. Also, the operation of each of power converters 1800–1802 has similarities to the operation of each of power converters 1400, 1401. Therefore, only the operational differences between power converters 1800–1802 and power converters 1400, 1401 will be described in detail here. A description of the operating characteristics common to power converters 1800–1802 and 1400, 1401 is provided above in connection with the descriptions of power converters 1300, 1301.

Referring now to FIG. 18(a), auxiliary winding 505 is energized only during the positive half cycle of the ac rectified input voltage. As a result, auxiliary capacitor 506 is charged only during this half cycle and the energy required for the operation of main winding 508 is stored in auxiliary capacitor 506 at this time. Turning on transistor switch 509 allows a current to flow in main winding 508, via auxiliary capacitor 506. Turning off transistor switch 509 diverts main winding 508's current from transistor switch 509 to diode 507. Diverting the current in this way results in an almost zero voltage potential being applied across main winding 508, thereby leading to freewheeling and a decay of current in main winding 508. The current from auxiliary winding 505 is not routed through transistor switch 509 or through diode 507, thereby eliminating the additional current requirement this would otherwise impose on these devices. Eliminating auxiliary winding 505's current flow through transistor switch 509 and diode 507 is a significant advantage, though active control of the current in auxiliary winding 505 is lost as a result. Additionally, power converter 1800 has the advantage of operating with only one capacitor.

Power converter 1801, illustrated in FIG. 18(b), is similar to power converter 1800, but includes dc source capacitor 503 for providing a filtered dc source voltage $V_s$ 510. This circuit structure allows a bi-directional current to flow through auxiliary winding 505, but in no way affects the operation of main winding 508.

Power converter 1802, illustrated in FIG. 18(c), is similar to power converter 1801 but connects diode 507 across the series connection of auxiliary and main windings 505 and 508, respectively, instead of across main winding 508 alone. This circuit structure enables current decay in main winding 508 through the application of a negative voltage across main winding 508. The negative voltage is created by the voltage potential difference across auxiliary capacitor 506 and dc source capacitor 503. Thus, the current path provided by diode 507 increases the rate of change of current through main winding 508 and eliminates the current in a shorter time. In summary, current control is rapid, leading to very good torque control in the machine. This circuit also preserves the feature of preventing charging current through main winding 508.

For the purpose of simplifying the description of the invention, the disclosed embodiments have been described above in connection with a two-phase SRM. However, these embodiments are equally applicable for use with a permanent magnet (PM) brushless dc machine (PMBDCM) and for use with machines having more than two phases. Other innovative features of the invention include:

1. One controllable switch and one diode, or optionally two diodes, for controlling a two-phase SRM.

2. An auxiliary capacitor serves as a snubber in addition to its function as an energy source for feeding an auxiliary winding.

3. The power converter circuit has a reduced number of power switches and other components.

4. The power converter's controllable switch does not require an isolated power supply, as the emitter of the switch is connected to the negative rail of a dc power supply, thereby resulting in significant cost savings in the gate control circuitry.

5. For low power applications, a single rectifier diode provides the dc source voltage from an ac source, thereby reducing the cost and component count.

6. The one controllable switch design makes feasible a brushless dc motor drive.

7. Controlling the dc motor drive is simple, since there is only one switch to be controlled, and this contributes to a more elementary control circuit for controlling speed and current.

8. A two-phase SRM may be used to develop a self-starting single-phase SRM, with the self-starting feature provided by the auxiliary winding able to start the SRM from any rotor position at rest.

9. The power converter topology can be used for any number of even phase SRMs.

10. The power converter topology can be used for half-wave (i.e., unidirectional current) PMBDCMs, having even numbers of stator phases preferably or odd numbers of stator phases with one winding serving as a common auxiliary winding of two or more phases.

11. Permanent magnets and other distinct mechanical devices are not necessary for starting the dc motor.

12. Only one common terminal is needed for current sensing and voltage sensing, to determine the motor's rotor position, thereby eliminating the need for isolation.

13. Rotor position sensing is continuous, since the auxiliary winding current is continuous. This need not be the case if higher efficiency operation is preferred.

14. High cost sensors with galvanic isolation are not required, since current sensing resistors and the auxiliary winding are utilized as low-cost sensors for current and position, respectively, thus providing an inexpensive solution to a critical control aspect of the two-phase SRM drive system.

15. The power converter concept and implementation can be carried to SRMs and PMBDCMs with any number of even or odd phases.

16. Diode 504 is optional and is not crucial to the operation of the power converter. But it does provide some additional control, such as preventing the charging of auxiliary capacitor 506 through auxiliary winding 505 at any time, and it allows the current to leave auxiliary winding 505 in only one direction.

17. A unique technique of starting and running an SRM or a PMBDCM with the power converter is provided. This enables the SRM or PMBDCM to start from all initial rotor positions, with respect to the stator poles, at rest. Also, the power converter operation may be continued and sustained at other speeds. Such a control process for starting and running the motor is integral to the operation of the power converter.

18. The power converter is capable of four-quadrant operation of the two-phase SRM or PMBDCM drive system.

19. The power converter circuit is capable of four-quadrant operation of the two-phase SRM or PMBDCM drive system using a single controllable switch.

20. Embodiments of the power converter with one capacitor instead of two capacitors have the least-known number of power devices and other components to realize a two-phase power converter drive system.

21. All embodiments of the power converter may use the same starting, running, and operational strategies described herein.

22. The current and voltage sensing, for control purposes, as described herein, are applicable to all embodiments of the invention. Additionally, all embodiments of the invention can use low-cost resistor sensing that does not require isolation.

23. Some power converter embodiments provide power factor correction and sinusoidal input current shaping on the ac input side. A unity power factor is achievable, for example.

24. Some power converter embodiments provide power factor correction and sinusoidal input current shaping on the ac input side of power converters applicable to brush dc machines (e.g., with two armature windings that may be termed the auxiliary and main windings).

The foregoing description illustrates and describes the present invention. However, the disclosure shows and describes only the preferred embodiments of the invention, but it is to be understood that the invention is capable of use in various other combinations, modifications, and environments. Also, the invention is capable of change or modification, within the scope of the inventive concept, as expressed herein, that is commensurate with the above teachings and the skill or knowledge of one skilled in the relevant art.

The embodiments described herein are further intended to explain best modes known of practicing the invention and to enable others skilled in the art to utilize the invention in these and other embodiments, with the various modifications that may be required by the particular applications or uses of the invention. Accordingly, the description is not intended to limit the invention to the form disclosed herein.

What is claimed is:

1. A controller for a switched reluctance motor or a permanent magnet brushless direct current (dc) motor having first and second phase windings, the controller comprising:
    first and second means for cooperating with the first and second phase windings of the motor to provide conduction circuits; and
    a switch, connected to said first and second means, that closes and opens a first of the conduction circuits, which includes the first phase winding, so as to regulate energization of the first and second phase windings of the motor and thereby provide four-quadrant operation of the motor.

2. The controller of claim 1, wherein said first and second means comprise:
    a capacitor that stores energy received from the first phase winding after the switch opens the first conduction circuit; and
    a rectifier that prevents current from flowing through the second phase winding to charge the capacitor.

3. The controller of claim 2, wherein the capacitor provides stored energy to energize the second phase winding.

4. The controller of claim 1, wherein said first and second means comprise:
    a capacitor that stores energy for energizing the second phase winding, wherein the capacitor is charged by snubbing energy received from the first phase winding when the switch opens the first conduction circuit.

5. The controller of claim 1, wherein said first and second means comprise:
    a capacitor that stores energy for energizing the second phase winding; and
    a rectifier that conducts current away from the first phase winding when the switch is opened, wherein:
    a first terminal of the rectifier is connected to a first terminal of the switch,
    a second terminal of the rectifier is connected to a first terminal of the capacitor, and
    a second terminal of the capacitor is connected to a second terminal of the switch.

6. The controller of claim 1, wherein said first and second means comprise:
    a capacitor that stores energy for energizing the second phase winding; and
    a rectifier that conducts energy away from the first phase winding to store in the capacitor, after the switch is opened.

7. The controller of claim 6, wherein the rectifier prevents the capacitor from releasing the stored energy directly, through the flow of a current, to the main phase winding and the switch.

8. The controller of claim 1, wherein said first and second means and the switch cooperate to start the motor from any static relative positioning of rotor and stator poles of the motor.

9. The controller of claim 1, wherein the motor is a two-phase motor.

10. The controller of claim 1, wherein said first and second means comprise:
    a resistor for being in a series conduction path with the first phase winding, wherein a current through the first phase winding is determinable from a voltage developed across the resistor.

11. The controller of claim 1, wherein said first and second means comprise:
    a resistor for being in a series conduction path with the second phase winding, wherein a rotor position of the motor is determinable from a voltage developed across the resistor.

12. The controller of claim 1, wherein said first and second means comprise a rectifier that rectifies an alternating current (ac) and provides the rectified current to the first and second means.

13. The controller of claim 12, wherein said first and second means comprise a capacitor that cooperates with the rectifier to provide a filtered dc voltage to the first and second means.

14. The controller of claim 1, wherein said first and second means further comprise a capacitor that stores energy for energizing the second phase winding.

15. The controller of claim 14, wherein said first and second means further comprise a rectifier that prevents current from flowing through the second phase winding in one direction.

16. The controller of claim 1, wherein said first and second means cooperate, under the control of the switch, to provide a unity power factor.

17. The controller of claim 1, wherein said first and second means cooperate, under the control of the switch, to provide input alternating current shaping.

18. A switched reluctance motor system, comprising:
    a brushless dc motor that has first and second phase windings;
    a first conduction circuit which includes the first phase winding and a means for cooperating with the first phase winding to provide the first conduction circuit; and
    a switch that opens and closes said first conduction circuit to regulate energization of the first and second phase windings of the motor and provide four-quadrant operation of the motor.

19. A method of controlling a multi-phase direct current (dc) motor, the method comprising:
    (a) energizing a main winding of the motor with a first current;
    (b) determining if the first current exceeds a current limit;
    (c) discontinuing the energization of the main winding if the first current is determined to exceed the current limit;
    (d) waiting a predetermined period;
    (e) determining, after discontinuing the energization of the main winding and waiting the predetermined period, whether a rotor of the motor is rotating; and
    (f) energizing the main winding with a predetermined amount of current that differs from the first current, if the rotor is determined not to be rotating.

20. The method of claim 19, wherein the predetermined amount of current is approximately 25 percent greater than the first current.

21. The method of claim 19, further comprising repeating steps (c) through (e).

22. The method of claim 21, further comprising repeating step (f).

23. The method of claim 22, wherein the predetermined amount of current applied to the main winding during the third energization is approximately 50 percent greater than the first current.

24. The method of claim 19, further comprising repeating steps (c) through (f) until the rotor is determined to be rotating.

25. The method of claim 24, wherein the predetermined amount of current applied to the main winding during the second and all subsequent energization cycles is a predetermined amount more than the current applied in the respective previous energization cycle.

26. A method of starting a direct current motor, the method comprising:
   determining whether a rotor pole of the motor is substantially aligned with a stator pole of the motor;
   energizing a winding of the motor to start a rotation of the rotor, if the rotor pole is determined not to be substantially aligned with the stator pole; and
   performing steps (a) through (d) if the rotor pole is determined to be substantially aligned with the stator pole:
   (a) energizing the winding with a first current;
   (b) discontinuing the energization of the winding;
   (c) determining, after discontinuing the energization of the winding, whether the rotor is rotating; and
   (d) energizing the winding with a predetermined current that is greater than the first current, if the rotor is determined not to be rotating.

27. The method of claim 26, further comprising repeating steps (b), (c), and (d) until the rotor is determined to be rotating.

28. The method of claim 27, wherein the predetermined amount of current applied to the winding during the second and all subsequent energization cycles is a predetermined amount more than the current applied in the respective previous energization cycle.

29. A start-up controller for a direct current motor, the start-up controller comprising:
   a power converter that has a controllable switch that provides current to a winding of the motor;
   a sensor that detects an indication of the amount of current provided to the motor winding by the power converter and outputs this indication in a first signal;
   a determination device that determines, based on the first signal, whether the amount of current provided to the motor winding exceeds a threshold value and outputs an indication of this determination in a second signal; and
   a controller that controls the controllable switch, in accordance with the second signal, by turning the controllable switch on to provide current to the motor winding and turning the controllable switch off to stop providing current to the motor winding; and
   a detector that detects an indication of an alignment position of a rotor of the motor with respect to a stator of the motor and outputs the indication in a third signal, wherein the controller controls the controllable switch in accordance with the third signal.

30. The start-up controller of claim 29, wherein the controller turns on the controllable switch when the third signal indicates that the alignment position of respective poles of the rotor and stator is within a first range of alignment and thereafter turns off the controllable switch when the second signal indicates the current provided to the motor winding exceeds the threshold value.

31. The start-up controller of claim 29, wherein:
   the sensor comprises a first resistor operable to be in a series current path with the motor winding and the controllable switch; and
   the detector comprises a second resistor operable to be in a series current path with another winding of the motor.

32. A start-up controller for a direct current motor, the start-up controller comprising:
   a power converter that has a controllable switch that provides current to a winding of the motor;
   a sensor that detects an indication of the amount of current provided to the motor winding by the power converter and outputs this indication in a first signal;
   a determination device that determines, based on the first signal, whether the amount of current provided to the motor winding exceeds a threshold value and outputs an indication of this determination in a second signal; and
   a controller that controls the controllable switch, in accordance with the second signal, by turning the controllable switch on to provide current to the motor winding and turning the controllable switch off to stop providing current to the motor winding, wherein:
   the controller turns off the controllable switch when the second signal indicates that the current provided to the motor winding, during a start-up procedure of the motor, exceeds the threshold value,
   the determination device increases the threshold value, after the controller turns off the controllable switch in response to the second signal, and
   the controller turns on the controllable switch after the determination device increases the threshold value.

33. The start-up controller of claim 32, further comprising a detector that detects an indication of an alignment position of a rotor of the motor with respect to a stator of the motor and outputs the indication in a third signal, wherein the controller determines whether the motor rotor is moving based on a comparison of a plurality of third signals received from the detector and discontinues the start-up procedure when the rotor is determined to be moving.

34. A start-up controller for a direct current motor, the start-up controller comprising:
   a power converter that has a controllable switch that provides current to a winding of the motor;
   a sensor that detects an indication of the amount of current provided to the motor winding by the power converter and outputs this indication in a first signal;
   a determination device that determines, based on the first signal, whether the amount of current provided to the motor winding exceeds a threshold value and outputs an indication of this determination in a second signal; and
   a controller that controls the controllable switch, in accordance with the second signal, by turning the controllable switch on to provide current to the motor winding and turning the controllable switch off to stop providing current to the motor winding, wherein:
   the sensor is a filter comprising a resistor that is in a series current path with the motor winding and the controllable switch, and
   the determination device comprises:
      a counter that stores a count of the number of times the controllable switch has been turned on in an interval;
      a multiplier that multiplies the count stored by the counter to produce a product;
      a reference device that stores a reference value;

a first summer that sums the stored reference value with the product provided by the multiplier to produce a first sum;

a second summer that sums the first sum and the negative value of the first signal to produce a second sum; and a comparator that compares the second sum to a comparison value to determine if the current provided to the motor winding exceeds the threshold value.

* * * * *